United States Patent [19]
Hayase et al.

[11] Patent Number: 5,962,581
[45] Date of Patent: Oct. 5, 1999

[54] SILICONE POLYMER COMPOSITION, METHOD OF FORMING A PATTERN AND METHOD OF FORMING AN INSULATING FILM

[75] Inventors: Shuzi Hayase, Yokohama; Yoshihiko Nakano, Tokyo; Rikako Kani, Yokohama; Mao Ito, Yokohama; Satoshi Mikoshiba, Yokohama; Takeshi Okino, Yokohama; Sawako Fujioka, Tokyo, all of Japan

[73] Assignee: Kabushiki Kaisha Toshiba, Kawasaki, Japan

[21] Appl. No.: 08/638,698

[22] Filed: Apr. 26, 1996

[30] Foreign Application Priority Data

| Apr. 28, 1995 | [JP] | Japan | 7-105165 |
| Dec. 20, 1995 | [JP] | Japan | 7-331997 |
| Dec. 27, 1995 | [JP] | Japan | 7-340696 |
| Mar. 12, 1996 | [JP] | Japan | 8-055029 |

[51] Int. Cl.$^6$ .................... C08K 3/34
[52] U.S. Cl. ............ 524/588; 528/10; 528/31; 528/21; 524/443; 524/789; 427/493; 427/510; 427/515; 427/387; 430/326; 430/322; 430/920; 522/63; 522/172
[58] Field of Search ............ 528/10, 31, 21; 522/172, 63; 524/588, 443, 789; 427/493, 510, 515, 387; 430/326, 322, 920

[56] References Cited

U.S. PATENT DOCUMENTS

| 4,587,205 | 5/1986 | Harrah et al. . |
| 4,588,801 | 5/1986 | Harrah et al. . |
| 4,719,273 | 1/1988 | Seyforth et al. .......... 528/15 |
| 4,871,646 | 10/1989 | Hayase et al. .......... 430/192 |
| 5,057,396 | 10/1991 | Tanaka et al. .......... 430/270 |
| 5,159,042 | 10/1992 | Tanaka et al. .......... 524/14 |
| 5,198,520 | 3/1993 | Onishi et al. .......... 528/33 |
| 5,372,908 | 12/1994 | Hayase et al. .......... 430/192 |
| 5,407,987 | 4/1995 | Fukushima et al. .......... 524/367 |

OTHER PUBLICATIONS

"Polysilane High Polymers," Robert D. Miller et al. American Chemical Society; Chemical Reviews, 1989, vol. 89, No. 6. pp. 1359–1410.

*Primary Examiner*—Margaret W. Glass
*Attorney, Agent, or Firm*—Oblon, Spivak, McClelland, Maier & Neustadt, P.C.

[57] ABSTRACT

A method of forming a pattern comprising the steps of forming a film of an organosilane compound comprising a polysilane having a repeating unit represented by the following general formula (1) on a substrate, irradiating an actinic radiation onto a predetermined portion of the film of the organosilane compound formed on the substrate, and removing the predetermined portion of the film irradiated by the actinic radiation by dissolving it with an aqueous alkaline developing solution.

(1)

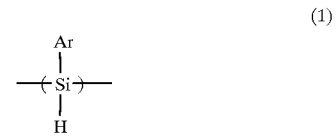

wherein Ar is a substituted or non-substituted aryl group.

36 Claims, 2 Drawing Sheets

SILICONE POLYMER COMPOSITION, METHOD OF FORMING A PATTERN AND METHOD OF FORMING AN INSULATING FILM

BACKGROUND OF THE INVENTION

1. Field of the Invention

This invention relates to a method of forming a pattern and an insulating film for use in the manufacture of an electronic element such as a semiconductor device or a liquid crystal display device, and to a silicone polymer composition for forming the pattern and the insulating film.

2. Description of the Related Art

A fine working technique using a photoetching is extensively utilized in the manufacture of electronic parts of various kinds including a semiconductor element and an integrated circuit. For example, in the manufacture of electronic parts, a resist film is first formed through a spin coating on a monocrystalline silicon wafer and then a mask having a desired pattern is superimposed on the resist film. Then, a light exposure, a development and a rinsing treatment are successively performed through the mask to form a pattern of the resist film. With this resist film pattern being formed on the wafer, an etching is performed to form desired lines and openings on the wafer. The degree of precision of this fine working technique in an electronic product is largely dependent on the performances of a resist material to be used, i.e. the resolution of the resist material on a substrate, the accuracy of photosensitivity of the resist material, the adhesion of the resist material to a substrate and the etching resistance of the resist material.

Recently, there has been an increasing expectation to the employment of polysilane as a resist material. For example, Japanese Patent Unexamined Publication No. S60-228542 discloses a technique of forming a positive pattern by making use of polysilane. The resist of this kind comprising a silicon-containing compound such as polysilane is featured in that a $SiO_2$-like film is formed on the surface of the resist by an oxygen reactive ion etching (oxygen RIE) after the formation of a resist pattern, thereby making it possible to obtain a resist pattern which is excellent in oxygen RIE resistance.

According to this known method, actinic radiation is irradiated onto polysilane to generate a volatile photo-depolymerized product, which is then evaporated, thus forming a pattern. However, in the method making use of such a dry phenomenon as explained above, it is very difficult to form a fine pattern in high precision. Moreover, the conventional method of forming a pattern by making use of polysilane is still defective in the respect of realizing a sufficient sensitivity of the polysilane.

Meanwhile, in the manufacture of a semiconductor device or a liquid crystal display device, it is required to form an insulating layer on the surface of a liquid crystal display device or on the surface of interconnecting wirings for securing an insulation of these surface from other element regions. In the formation of an insulation film for covering an interconnecting wiring, the following method has been conventionally adopted.

(1) A method of depositing a silicon compound by way of a CVD method.

(2) A method wherein a solution comprising an alkoxy-containing polysiloxane formed of polysiloxane whose side chain is substituted by alkoxy group is coated on a substrate, and then the alkoxy group on the side chain is dissociated with water to generate SiOH, which is then condensed, thus forming a crosslinking Si—O—Si bond.

(3) A method wherein an organosilica sol of an alkoxy-substituted silane such as tetraethoxy silane or of alkoxy-containing siloxane of low molecular weight is coated on a substrate, the resultant coated layer being subsequently thermally dried.

(4) A method wherein a solution comprising a polysilane whose side chain is substituted by alkoxy group is coated on a substrate, and then the alkoxy group on the side chain is dissociated with water to generate SiOH, which is then condensed and at the same time the backbone chain of the polysilane is photo-oxidized, thus forming a crosslinking Si—O—Si bond.

(5) A method wherein a solution comprising a polymer constituted by a two-dimensionally extended polysilane is coated on a substrate, and the resultant coated polymer layer is photo-oxidized and thermally dried, thus forming a crosslinking Si—O—Si bond.

However, even with these methods (1) to (5), it is still difficult to obtain an insulating film of good quality, which is excellent in surface flatness and free from cracking associated with the volume shrinkage.

For example, the insulating film to be formed by way of a CVD method according to the aforementioned method (1) is defective in surface flatness. Meanwhile, it may be possible, with the employment of the aforementioned methods (2) to (5), to easily obtain an insulating film of desired film thickness, which is excellent in surface flatness. However, the aforementioned method (2) is accompanied with a problem that the large alkoxy group is eliminated in the process of cross-linking during the thermal drying step, so that a prominent volume shrinkage of the polymer may be resulted. Furthermore, this method is also accompanied with a problem that the polymer may be gradually hydrolyzed during the storage thereof, thus indicating the poor storage stability thereof.

On the other hand, the aforementioned method (3) is also accompanied with a problem that the large alkoxy group is eliminated in the process of cross-linking during the thermal drying step, so that a prominent volume shrinkage of the polymer may be resulted. In particular, since the cross-linking is effected from a low molecular weight material, cracks resulting from the volume shrinkage may be generated in the insulating film to be formed. Furthermore, since the organosilica sol may be gradually hydrolyzed during the storage thereof, it may give rise to the problem of poor storage stability. The aforementioned methods (4) and (5) are also accompanied with problems that the prepolymer to be employed therein tends to be easily gelated, thus making it difficult to form a coated layer, and that the storage stability the prepolymer is poor.

It is some times required that an insulating film formed on an interconnecting wiring is patterned to form a contact hole. However, it is very difficult to perform such a patterning on the insulating film to be formed according to the aforementioned methods (1) to (5). Namely, a resist pattern is first deposited on the insulating film, and then the etching of the insulating film is performed using the resist pattern as an etching mask, the resist pattern being required to be peeled away subsequently. Thus, since the manufacturing process becomes very complicated according to these methods as indicated above, the insulating film pattern can not be obtained in an inexpensive manner.

In view of this, there has been proposed a technique to simplify the process of forming an insulating film pattern, wherein the photo-sensitivity of polysilane is made use of. According to this technique, after polysilane is patterned, the resultant pattern is heated to turn it into an insulating material. More specifically, since polysilane is featured in that the molecular weight thereof can be decreased when it is exposed to the irradiation of ultraviolet rays, a pattern of polysilane film can be formed by the steps of selectively exposing the polysilane film to the irradiation of ultraviolet rays, and then dissolving the irradiated portion of the polysilane film with the use of a polar solvent such as alcohol or ketone to develop the pattern of the polysilane film. Subsequently, after being further irradiated with ultraviolet rays if required, the resultant pattern is heat-dried to turn the polysilane into a siloxane, thereby obtaining an insulating film pattern.

However, since the pattern thus obtained is formed of a single-dimensional siloxane obtained by heat-drying polysilane, the pattern is defective in reliability in terms of heat resistance etc. if it is to be used as an insulating film. Moreover, the pattern obtained in this manner is poor in adhesion to a substrate.

Recently, it is reported that when polysilane is irradiated with ultraviolet rays and then immersed in a solution of a dyestuff, the ultraviolet ray-irradiated portion, or photo-oxidized portion of the polysilane film can be selectively colored (Yokoyama et al, Chemistry Letters, 1563 to 1566, 1991). Therefore, a method of manufacturing a color filter making use of this phenomenon has been tried. For example, in Japanese Patent Unexamined Publication H5-88215, there is proposed a method of manufacturing a color filter wherein a film of polysilane represented by the following general formula (5) is deposited on a substrate, and then a sequence of steps comprising a selective irradiation of ultraviolet rays to the polysilane film and a dipping of the polysilane film in a dyestuff solution is repeated for each of three colors, i.e. R, G and B.

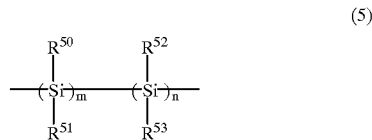

(5)

wherein $R^{50}$, $R^{51}$, $R^{52}$ and $R^{53}$ may be the same or different and are individually a substituted or non-substituted hydrocarbon group; m and n are respectively an integer.

Namely, according to this method of manufacturing a color filter, the step of developing a resist pattern is not required at all and the step of forming a film may be performed once for all. Therefore, the manufacturing process of color filter can be extremely simplified as compared with the ordinary method of using a negative resist film containing a color component. Furthermore, since the formation of film for three colors of R, G and B can be performed en bloc, a color filter of high precision having a flat color layer can be manufactured. However, the polysilane represented by the aforementioned general formula (5) is accompanied with the problems that the adsorption rate of a dyestuff onto an ultraviolet ray-irradiated portion is rather slow so that a long period of time is required for coloring the ultraviolet ray-irradiated portion, and that the durability and mechanical strength of the colored layer are insufficient for the actual use.

As explained above, even though the formation of patterns using polysilane as a resist material has long been tried up to date, it has been difficult with the employment of polysilane to form a fine pattern in high precision, and the sensitivity of the polysilane has been in most cases proved to be insufficient. Meanwhile, if the formation of pattern by way of an alkaline development is possible, the precision of pattern may be expected to be improved. However, polysilane is generally insoluble to an aqueous alkaline solution, so that it is impossible to form a pattern by way of an alkaline development.

On the other hand, with regard to an insulating film formed of polysilane, it is still failed to obtain an insulating film which is excellent in surface flatness and also in film quality, and at the same time the reliability of the insulating film in terms for example of adhesion onto a substrate is still unsatisfactory.

There has been also proposed to employ a specific kind of organic polysilane in place of the conventional negative resist film and to omit the developing step by selectively coloring an ultraviolet-irradiated portion of the organic polysilane. However, the method is also accompanied with the problems that it takes a long period of time for coloring the ultraviolet ray-irradiated portion, and that the durability and mechanical strength of the colored layer to be obtained are poor.

SUMMARY OF THE INVENTION

Therefore, a first object of the present invention is to provide a silicon polymer composition which is capable of forming a fine pattern in high precision and in high sensitivity by making use of an alkali development.

A second object of the present invention is to provide a silicon polymer composition which is highly sensitive to light and capable of forming a pattern excellent in cross-sectional shape and in resolution.

A third object of the present invention is to provide a silicon polymer composition which is capable of forming an insulating film which is excellent in adhesion to a substrate and in heat resistance, and has a high electric resistance and a mechanical strength.

A fourth object of the present invention is to provide a method of forming a colored pattern having a flat surface, which is excellent in durability and mechanical strength; and a method forming an insulating film pattern which is excellent in adhesion to a substrate and heat resistance.

A fifth object of the present invention is to provide a method which makes it possible to obtain an insulating film which is excellent in surface flatness and free from the generation of cracks resulting from volume shrinkage; or an insulating film which is excellent in adhesion to a substrate and heat resistance, and is high in electric resistance and mechanical strength.

In order to achieve these objects, this invention provides as a first embodiment a silicon polymer composition comprising a polysilane having a repeating unit represented by the following general formula (1) and a crosslinking agent for the polysilane.

(1)

wherein Ar is a substituted or non-substituted aryl group.

There is also provided, according to this invention as a second embodiment, a silicon polymer composition comprising a polysilane having a repeating unit represented by the following general formula (1) and a compound which is capable of generating a radical or an acid as it is irradiated by an actinic radiation.

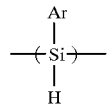
(1)

wherein Ar is a substituted or non-substituted aryl group.

There is also provided, according to this invention as a third embodiment, a silicon polymer composition comprising a polysilane having a repeating unit represented by the following general formula (4) and at least one kind of fine powders selected from $SiO_2$ fine powder and SiN fine powder.

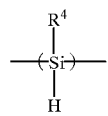
(4)

wherein $R^4$ is a substituted or non-substituted aryl group, or a substituted or non-substituted alkyl group.

There is also provided, according to this invention as a fourth embodiment, a method of forming a pattern comprising the steps of forming a film of an organosilane compound comprising a polysilane having a repeating unit represented by the following general formula (1) on a substrate; irradiating an actinic radiation onto a predetermined portion of the film of the organosilane compound formed on the substrate; and removing the predetermined portion of the film irradiated by the actinic radiation by dissolving it with an aqueous alkaline solution.

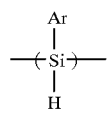
(1)

wherein Ar is a substituted or non-substituted aryl group.

There is also provided, according to this invention as a fifth embodiment, a method of forming a pattern comprising the steps of forming a film of an organosilane compound comprising a polysilane having a repeating unit represented by the following general formula (1) on a substrate; irradiating an actinic radiation onto a predetermined portion of the film of the organosilane compound formed on the substrate; heating the film of the organosilane compound after the irradiation of the actinic radiation; and removing a non-irradiated portion of the film by dissolving it with an organic solvent.

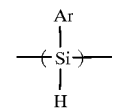
(1)

wherein Ar is a substituted or non-substituted aryl group.

There is also provided, according to this invention as a sixth embodiment, a method of forming a pattern comprising the steps of forming a film of an organosilane compound comprising a silicon polymer composition comprising a polysilane having a repeating unit represented by the following general formula (1) and a compound which is capable of generating a radical or an acid as it is irradiated by an actinic radiation on a substrate; irradiating an actinic radiation onto a predetermined portion of the film of the organosilane compound formed on the substrate; dipping the film of the organosilane compound after the aforementioned irradiation step in a solution containing a color component; and heat-drying the film of the organosilane compound after the aforementioned coloring step thereby to turn the film into a three-dimensional structure.

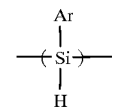
(1)

wherein Ar is a substituted or non-substituted aryl group.

There is also provided, according to this invention as a seventh embodiment, a method of forming a pattern comprising the steps of forming a film of an organosilane compound comprising a polysilane having a repeating unit represented by the following general formula (4) on a substrate; irradiating an actinic radiation onto a predetermined portion of the film of the organosilane compound formed; impregnating at least one kind of fine powders selected from $SiO_2$ fine powder and SiN fine powder in the predetermined portion irradiated by the actinic radiation; and heat-drying the film of the organosilane compound after the aforementioned impregnating step thereby to turn the film into a three-dimensional structure.

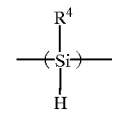
(4)

wherein $R^4$ is a substituted or non-substituted aryl group, or a substituted or non-substituted alkyl group.

There is also provided, according to this invention as a eighth embodiment, a method of forming an insulating film comprising the steps of forming a film of an organosilane compound comprising a polysilane having a repeating unit represented by the following general formula (1) on a substrate; and heat-drying the film of the organosilane compound in an oxygen-containing atmosphere thereby to turn the film into a three-dimensional structure.

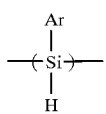

(1)

wherein Ar is a substituted or non-substituted aryl group.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1A:
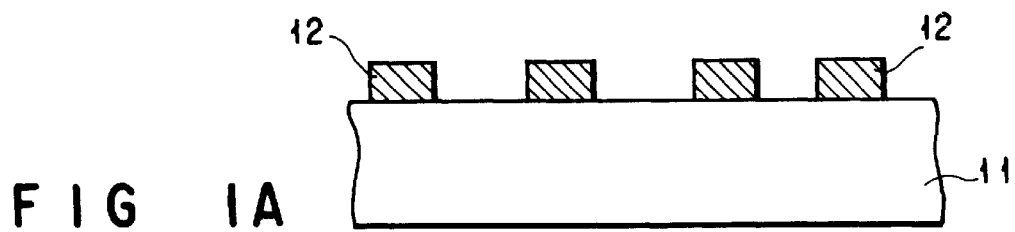
FIGS. 1A to 1D are sectional views schematically showing one example of the process for forming a pattern according to this invention.

This invention will be further explained with reference to the following preferred embodiments.

In the silicon polymer composition of the first embodiment, the hydrogen atom attached to one of the side chains of polysilane is converted to hydroxyl group as the polysilane is irradiated by an energy beam such as light, electron beam or X-ray, thereby forming Si—OH bond. As for the Si—Si backbone chain of polysilane, the backbone chain may be decomposed as the energy beam is absorbed by polysilane, and then oxygen or water in the air atmosphere or in the coated resist film is taken up by the decomposed chain, thereby also forming Si—OH bond.

When aryl group is attached to the other side chain of polysilane as in the case of the first embodiment, the acidity of silanolic hydroxyl group produced in the aforementioned manner becomes very high, thus exhibiting a prominent solubility to an aqueous alkaline solution. Moreover, the silanolic hydroxyl groups thus produced hardly react with each other as compared with the polysilane where alkyl group is attached as a side chain, thus making it possible to keep the stability thereof without forming a crosslinking between the silanolic hydroxyl groups. Therefore, the solubility in an aqueous alkaline solution of the light non-exposed portion of polysilane not having the silanolic hydroxyl groups can be made quite different from that of the light exposure portion of polysilane, so that the light exposure portion of polysilane can be selectively removed by dissolving it with an alkaline developing solution, thus making it possible to obtain a positive pattern.

Furthermore, in the silicon polymer composition of according to the first embodiment, since the light non-exposed portion of polysilane is inherently insoluble in an aqueous alkaline solution, it is not necessarily required to decompose the Si—Si backbone chain of polysilane so as to differentiate the light exposure portion in molecular weight from the light non-exposed portion at the step of irradiating an energy beam. Therefore, it is possible to form a pattern as explained above in very high sensitivity.

The aryl group to be attached as a side chain to polysilane according to the first embodiment should preferably be selected from those having 6 to 24 carbon atoms. Specific examples of them are phenyl group, naphthyl group and anthryl group. The polysilane in this case may be a homopolymer or copolymer. The copolymer of polysilane may contain a repeating unit other than that represented by the general formula (1) as long as the ratio of the repeating unit represented by the general formula (1) is 30% or more, preferably 50% or more. There is no limitation with respect to the molecular weight of polysilane, but generally the molecular weight of polysilane should preferably be in the range of 500 to 100,000, more preferably 1,000 to 10,000. Because, if the molecular weight of polysilane is too small, it may become difficult to form a coated film having a sufficient durability. On the other hand, if the molecular weight of polysilane is too large, the solubility in a solvent of the polysilane may be lowered, so that the formation of film by coating may become troublesome. Followings are specific examples of polysilane to be employed in the first embodiment of this invention.

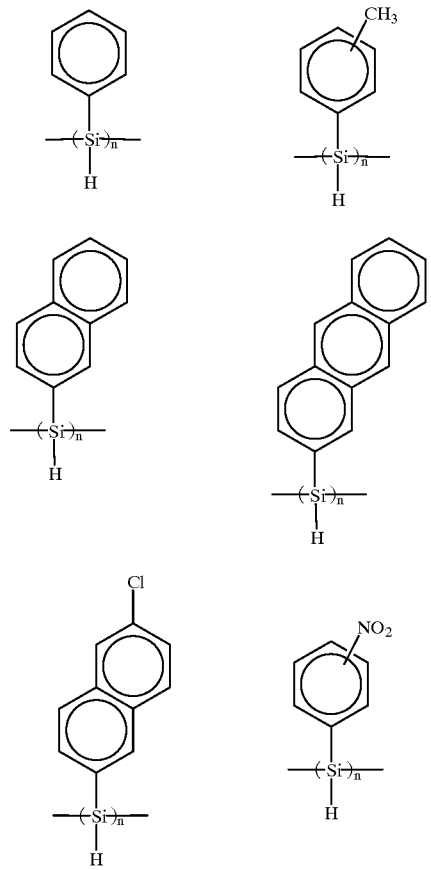

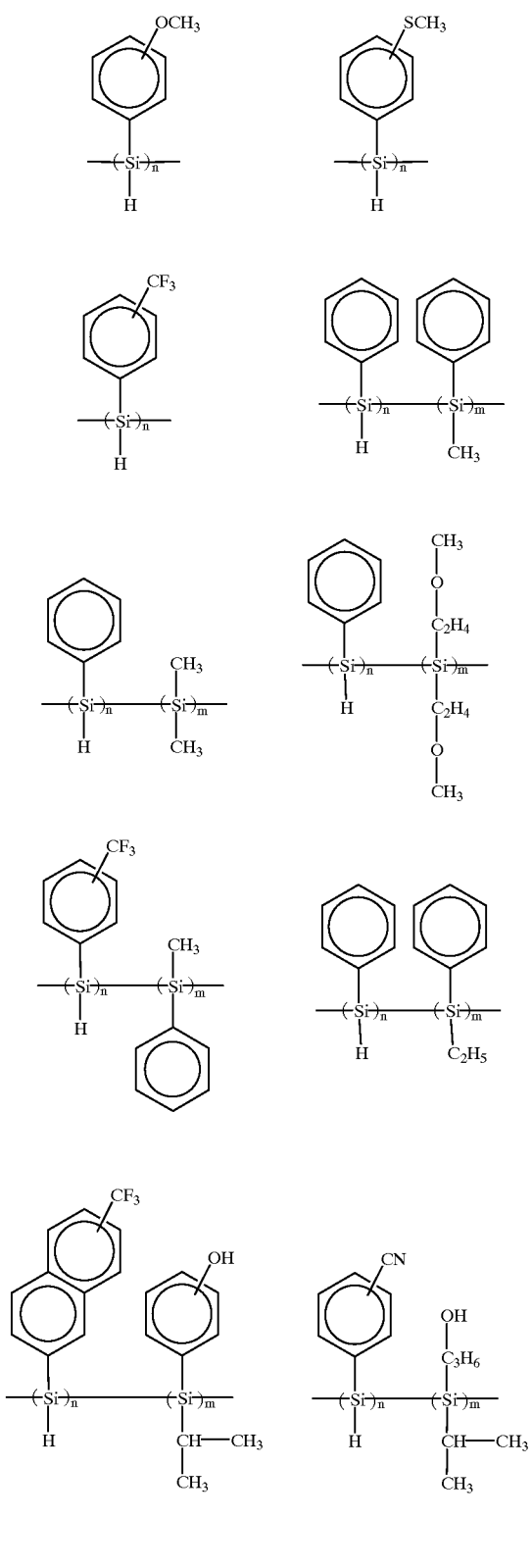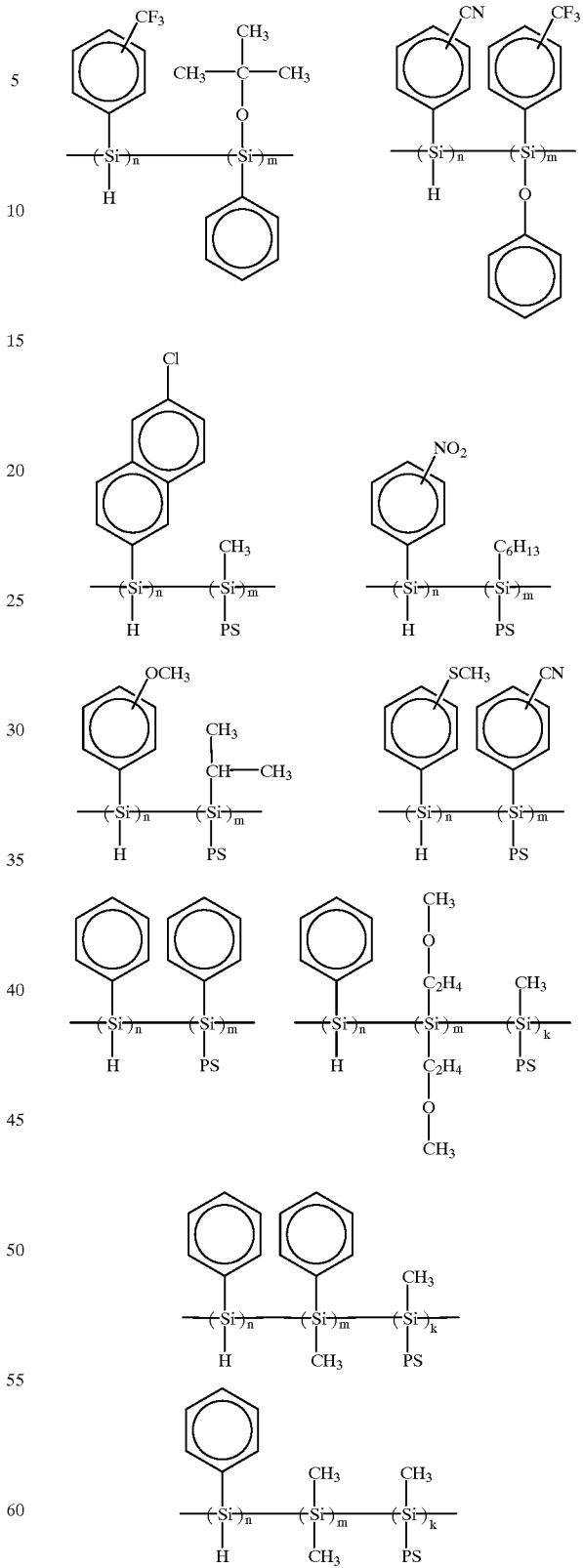

-continued

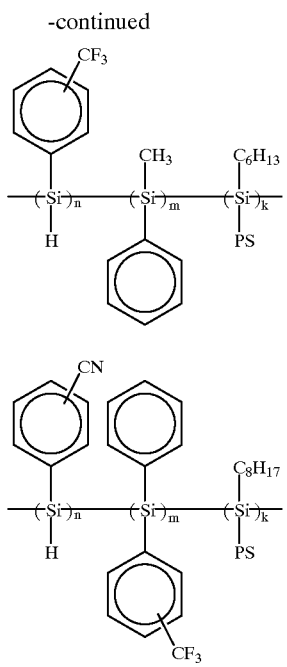

wherein n, m and k respectively represents a polymerization degree, and PS represents a polysilane skeleton.

These polysilanes may be synthesized by a reductive coupling reaction using $RSiHCl_2$ in the presence of a sodium catalyst, or by an electrolytic polymerization. A copolymer may be synthesized in the same manner. For example, if a copolymer is to be synthesized by way of a reductive coupling reaction, $RSiHCl_2$ may be copolymerized with $R'R''SiCl_2$ (wherein R' and R'' are substituted or non-substituted hydrocarbon groups). Further, in view of controlling the polymerization degree, RSiHACl (wherein A represents a terminal group) may be copolymerized. However, when the polysilane is synthesized by way of the reductive coupling reaction, the sodium catalyst may be left in the resultant polysilane as an ionic impurity.

On the other hand, these polysilanes may also be synthesized by way of a dehydrogenation reaction of $RSiH_3$ in the presence of a titanium or zirconium catalyst. In this case, the polysilane to be synthesized by way of dehydrogenation reaction using a zirconium catalyst is not only free from ionic impurities, but also free from the formation of silanolic hydroxyl group that might be bonded to the terminal silicon atom of the polymer, so that the polysilane can be very advantageously used for the formation of fine resist pattern by making use of an alkaline development.

As for the cross-linking agent to be used in the first embodiment of this invention, a compound which is capable of thermally reacting with the hydrogen atom attached to the side chain of polysilane, more specifically an unsaturated compound having two or more of unsaturated groups such as tetravinyl silane or phenylene dialdehyde may be employed. The mixing ratio of the unsaturated compound may be 1 wt. % or more based on the weight of polysilane. However, if the mixing ratio of the unsaturated compound is too large, the amount of unsaturated compound which does not take part in the crosslinking of the polysilane would be increased and may become a cause of deteriorating the heat resistance of the pattern. Therefore, the upper limit of the mixing ratio of the unsaturated compound may preferably be 30 wt. %.

Since the silicon polymer composition according to the first embodiment of this invention contains a crosslinking agent as mentioned above, the polysilane in the pattern can be crosslinked in subsequent to the formation of a pattern using the silicon polymer composition, thus improving the mechanical strength and heat resistance.

A radical-generating agent or an ionic catalyst which is capable of promoting a reaction between polysilane and an unsaturated compound may be employed in general as a crosslinking agent in the silicon polymer composition according to the first embodiment of this invention. As for the radical-generating agent, azobisisobutyronitrile, benzoyl peroxide, dicumyl peroxide or triphenyl-t-butyl peroxide may be employed. As for the ionic catalyst, chloroplatinic acid or a complex comprising chloroplatinic acid to which an unsaturated ligand group is attached may be used. The mixing ratio of the radical-generating agent should preferably be 1 to 30 wt. %, while the mixing ratio of the ionic catalyst should preferably be 0.1 to 5 wt. %. Because, if the mixing ratio of the radical-generating agent or the ionic catalyst is too little, the reaction between the polysilane and the unsaturated compound may not be smoothly carried out, while if the mixing ratio of the radical-generating agent or the ionic catalyst is too large, the heat resistance of pattern may be deteriorated.

In the first embodiment of this invention, the silicon polymer composition may be prepared by mixing the aforementioned polysilane with an alkali-soluble organic compound. In this case, the polysilane which is insoluble in an aqueous alkaline solution acts as a solubility-inhibiting agent for the alkali-soluble organic compound, but once the polysilane is irradiated with an energy beam, a silanolic hydroxyl group is generated in the polysilane, thus making the polysilane soluble in the aqueous alkaline solution. Accordingly, a light-exposure portion of polysilane can be selectively dissolved and removed by an alkaline development treatment, thus making it possible to obtain a positive pattern.

Examples of such an alkali-soluble organic compound are an oligomer or polymer having a phenolic hydroxyl group or carboxylic acid residue. Specific examples of such an oligomer or polymer are a novolak resin to be obtained via condensation between formaldehyde and phenols such as phenol, o-chlorophenol, m-chlorophenol, p-chlorophenol, m-cresol, p-cresol, bisphenol A or 4-chloro-3-cresol; poly(p-vinylphenol); poly(p-isopropenylphenol); poly(m-isopropenylphenol); a copolymer of methyl methacrylate with p-hydroxy styrene; a copolymer of methyl acrylate with p-hydroxy styrene; a copolymer of methyl acrylate with p-isopropenylphenol; a copolymer of methacrylic acid with p-hydroxy styrene; and polyamic acid. Followings are specific examples of such an alkali-soluble organic compound to be used in the first embodiment of this invention.

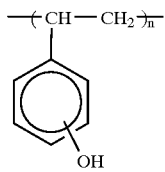

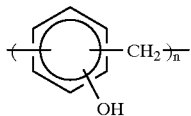

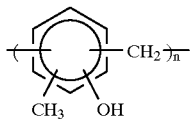

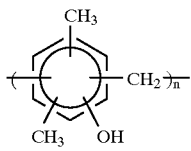

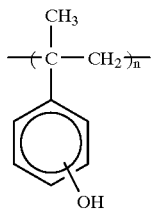

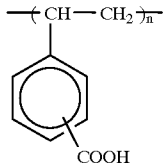

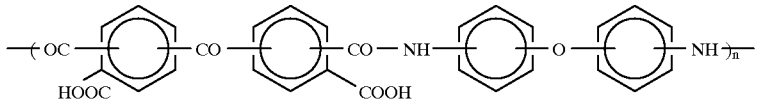

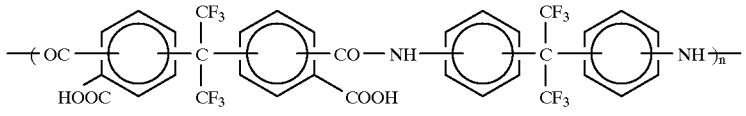

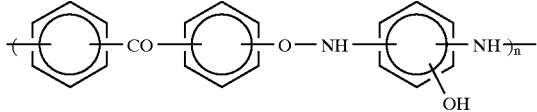

wherein n represents a polymerization degree.

If a resist is to be formed by mixing a polysilane with an alkali-soluble organic compound according to the first embodiment of this invention, the mixing ratio of the alkali-soluble organic compound should preferably be set to 95 wt. % or less. This is because, if the mixing ratio of the alkali-soluble organic compound is too large, the sensitivity of the resultant resist would more likely be lowered. In view of sufficiently giving the effect of the alkali-soluble organic compound to an resist, the mixing ratio of the alkali-soluble organic compound should preferably be set to 0.01 wt. % or more.

The silicon polymer composition of the first embodiment of this invention may be prepared by dissolving any of aforementioned polysilane in a suitable organic solvent together with, if required, a crosslinking agent and an alkali-soluble organic compound. Examples of the organic solvent useful in this case are toluene, xylene, dimethylformamide, dimethylacetoamide, methyl cellosolve, o-dichlorobenzene, chloroform, ethanol, i-propylalcohol, cyclopentanone, cyclohexanone, ethyl cellosolve acetate, acetone, methylethyl ketone, ethyl acetate and butyl acetate. These compounds may be used singly or in combination.

Next, a method of forming a pattern by making use of a silicon polymer composition of the first embodiment of this invention will be explained. First of all, a solution containing polysilane prepared as described above is coated on the surface of a predetermined substrate. Then, the coated layer is prebaked to evaporate an organic solvent in some extent, thereby forming a film of an organosilane compound. Subsequently, an energy beam such as ultra-violet rays, KrF excimer laser beam, an electron beam or x-rays is irradiated through a prescribed mask pattern onto the surface of the organosilane compound film. The dosage of irradiation should preferably be in the range of about 0.1 mJ/cm$^2$ to 5 J/cm$^2$. This irradiation can be performed by way of either a contact exposure method or a projection exposure method.

Since the light-exposed portion of the polysilane is turned into a polymer structure having silanolic hydroxyl group, and therefore is now made soluble in an aqueous alkaline solution as explained above, the light-exposed portion of the polysilane can be selectively dissolved and removed by an alkaline development treatment, thus forming a positive pattern. Examples of the aqueous alkaline solution useful in this case are an aqueous organic alkaline solution such as tetramethyl ammonium hydroxide and choline, and an aqueous inorganic alkaline solution such as potassium hydroxide or sodium hydroxide. The development treatment can be performed by way of a dipping method or a spray method. It is also possible to employ an aqueous solution of hydrofluoric acid in place of an aqueous alkaline solution thereby to form a positive pattern.

The aforementioned method of forming a pattern by making use of a silicon polymer composition of the first embodiment of this invention may be particularly suited for use in the formation of a multi-layer resist system as explained below. Namely, a flattening agent is coated over the surface of a substrate and then dried at temperature of 50 to 250° C., preferably 80 to 220° C. in general over a time period of 0.5 to 120 minutes, preferably 1 to 90 minutes thereby to form a flattening layer of predetermined film thickness. Examples of a substrate useful in this case are a silicon wafer; a silicon wafer provided on its surface with various kinds of insulating film, electrodes and wirings, thus being formed with stepped surface portions; or a blank mask. As for the flattening agent, there is no limitation as long as the purity thereof is sufficient enough to raise no problem in the manufacture of a semiconductor integrated circuit. Examples of such a flattening agent are a positive type resist comprising a substituted naphthoquinone diazide and a novolak resin, polystyrene, polymethyl methacrylate, polyvinyl phenol, a novolak resin, polyester, polyvinyl alcohol, polyethylene, polypropylene, polyimide, polybutadiene, polyvinyl acetate and polyvinyl butyral. These resins may be used singly or in combination.

Then, a solution containing a silicon polymer composition is coated on the surface of the flattening layer thus obtained, and prebaked at a temperature of 50 to 200° C., preferably 80 to 120° C. over a time period of 0.5 to 120 minutes, preferably 1 to 60 minutes thereby to form a resist film of desired film thickness consisted of an organosilane compound film. The coating a solution containing a silicon polymer composition can be performed by employing a method selected from a spin coating method using a spinner, a dipping method, a spray method and a printing method.

The thickness of the resist film may be arbitrarily adjusted by suitably selecting a coating method, the concentration of polysilane in the solution and viscosity of the solution.

Then, the light exposure and development are performed onto the film of the organosilane compound thereby to form a positive pattern, which is then heat-treated, preferably through a stepwise baking, if required at a temperature of 50 to 200° C. for 0.5 to 120 minutes. With this heat treatment, the cross-linking of silicon atoms of polysilane constituting the pattern takes place via a cross-linking agent, since the cross-linking agent is mixed in advance in the silicon polymer composition of the first embodiment. As a result, the strength and heat resistance of the pattern can be improved.

In this case, the pattern may be subjected to a light exposure before carrying out the aforementioned heat treatment, thereby preliminarily inducing the photo-oxidation of polysilane and the generation of radicals from the radical-generating agent and at the same time promoting the progress of the cross-linking of the polysilane at the time of heat treatment. Namely, with this preliminary light exposure performed in this manner, the silicon atoms of the polysilane may be re-bonded via oxygen atom at the occasion of the cutting of the backbone chain of polysilane, thereby making it possible to form a glass matrix which is very excellent in mechanical strength and heat resistance. The glass matrix obtained in this manner can be utilized as it is as a surface-protecting film or as an insulating film. In this case, it is also possible to obtain a strong three-dimensional cross-linked structure, without employing a cross-linking agent for the polysilane, by heat-treating the pattern so as to allow the silicon atoms of polysilane to take up oxygen atoms in the air atmosphere thereby to form the cross-linking.

Thereafter, a portion of the flattening layer exposed through the pattern formed in this manner is etched by making use of oxygen gas plasma or a solvent with the pattern being used as a mask. In this case, the oxygen reactive ion etching method (the oxygen RIE method) using an oxygen gas plasma is preferably used for the etching, which is generally carried out under the conditions of $1 \times 10^{-4}$ to $1 \times 10^{-1}$ Torr and 0.01 to 10 w/cm$^2$ for 1 to 120 minutes. The pattern formed by making use of the silicon polymer composition of the first embodiment is featured in that silicon dioxide (SiO$_2$) film and the like is formed on the surface thereof as the pattern is exposed to the oxygen RIE, so that the oxygen RIE resistance property of the pattern becomes 10 to 100 times higher than that of the exposed flattening layer. As a result, the portion of the flattening layer exposed through the pattern can be selectively etched away by way of the oxygen RIE method, thus obtaining an optimum pattern profile.

Finally, the etching of the substrate is performed using the pattern thus obtained as a mask. In this case, etching may be performed by way of a wet etching or a dry etching. However, if a fine pattern having a line width of 3 μm or less is to be formed, the employment of dry etching is preferred. As for the wet etching agent, an aqueous solution of hydrofluoric acid or ammonium fluoride may be used for the etching of a silicon oxide film, an aqueous solution of phosphoric acid, acetic acid or nitric acid may be used for the etching of an aluminum film, and an aqueous ammonium solution of cerium nitrate may be used for the etching of a chromium-based film. As for the dry etching gas, CF$_4$, C$_2$F$_6$, CCl$_4$, BCl$_3$, Cl$_2$, HCl or H$_2$ may be used singly or in combination thereof if required. The etching conditions such as the concentration of a wet etching agent in a reaction column, the concentration of the dry etching gas, the reaction temperature and the reaction time may be suitably determined based on the combination of the kind of material to be employed for forming a fine pattern and the kind of a resist to be used. There is no limitation however as to the specific method of etching.

After this etching process, the flattening layer as well as the pattern formed using the silicon polymer composition of the first embodiment, which are remaining on the surface of the substrate, are removed by making use of a stripping agent such as J-100 (tradename, Nagase Kasei Co.) or an oxygen gas plasma.

Any additional steps may be added if required to the aforementioned process depending on the purpose of process. For example, a pretreatment for improving the adhesion between a resist film containing a resist comprising the silicon polymer composition of the first embodiment and the flattening layer, or between the flattening layer and the substrate, a rinsing step for removing a residual developing solution after the development of a resist film, or a re-irradiation step for irradiating ultraviolet rays onto a resist film before dry etching step may be additionally performed. The above explanations are mainly centered on the case where the silicon polymer composition of the first embodiment of this invention is applied to the formation of a multi-layer resist system, but the silicon polymer composition of the first embodiment can be also applied to the formation of the conventional single-layer resist.

Next, a silicon polymer composition according to a second embodiment of this invention will be explained.

As for the polysilane to be used in this second embodiment of this invention, the same kinds of compounds as set forth in the aforementioned explanation of the first embodiment can be used.

In the silicon polymer composition of the second embodiment, since hydrogen atom is attached to one of the side chains of the polysilane, it is converted to hydroxyl group as the polysilane is irradiated by an energy beam such as light, electron beam or X-ray, thereby forming Si—OH bond. With regard to the Si—Si backbone chain of polysilane, the backbone chain may be decomposed as the energy beam is absorbed by polysilane, and then oxygen or water in the air atmosphere or in the coated resist film is taken up by the decomposed chain, hence the Si—OH bond is further formed.

There is no limitation with respect to a compound which is capable of generating a radical as it is irradiated by actinic radiation (hereinafter referred to as a radical-generating agent) and also to a compound which is capable of generating an acid as it is irradiated by actinic radiation (hereinafter referred to as an acid-generating agent) as long as they are capable of generating a radical or an acid, both compounds being mixed in the silicon polymer composition of the second embodiment. However, the employment of the radical-generating agent as a sensitizer is more preferable in the silicon polymer composition of the second embodiment. This is because, since the radical-generating agent is capable of activating the hydrogen atom on the side chain of the polysilane so as to easily generate a silanol bond (Si—OH), the sensitivity of the polysilane to an actinic radiation would be enhanced.

Examples of the radical-generating agent are an azo compound such as azobisisobutyl nitrile; a peroxide such as benzoyl peroxide, di-tertiary butyl peroxide; and alkyl aryl ketone such as benzoin, benzoin alkyl ether, benzoin alkyl aryl thioether, bonzoin aryl ether, benzoyl alkyl aryl thioether, benzyl aralkyl ethanol, phenyl glyoxal alkyl acetal, benzoyl oxime and organic halides shown below.

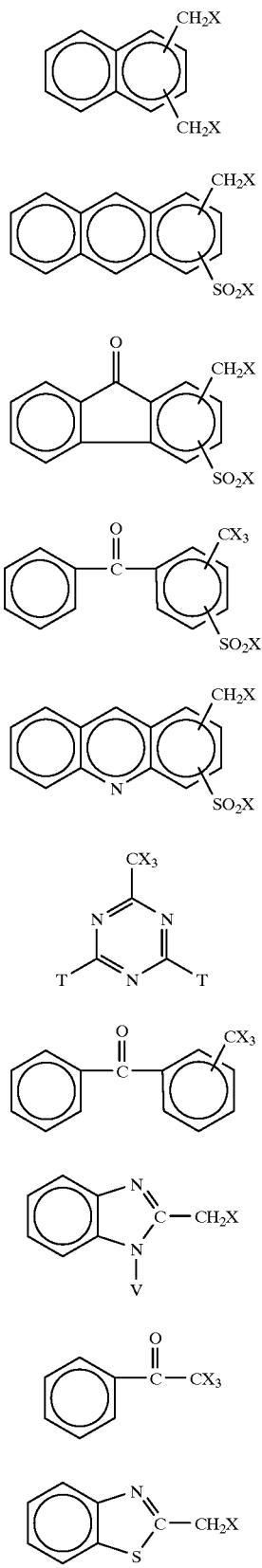

-continued

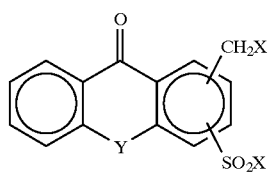

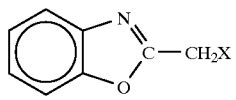

wherein Y is —O—, —CH$_2$—, —CHX—, —S— or —C(=O); X is Cl, Br or I; V is hydrogen atom, or substituted or non-substituted alkyl group; and T may be the same or different and is individually a substituted or non-substituted alkyl, aryl, heteroaryl, alkoxy, amino or vinyl group.

Among these organic halides, trihalomethyl-s-triazine described in U.S. Pat. No. 3,779,778, i.e. the compound represented by the following general formula (2) may be preferably used. Specific examples of such a compound are 2,4-bis(trichloromethyl)-6-methyl-s-triazine and 2,4,6-tris (chloromethyl)-s-triazine

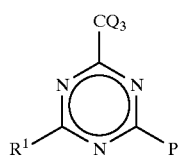
(2)

wherein Q is bromine atom or chlorine atom; P is —CQ$_3$, —NH$_2$—, —NHR$^2$, —N(R$^2$)$_2$, —OR$^2$ or a substituted or non-substituted phenyl group (herein, Q is bromine atom or chlorine atom, R$^2$ is phenyl group, naphthyl group or lower alkyl group having not more than 6 carbon atoms); and R$^1$ is —CQ$_3$, —NH$_2$—, —NHR$^2$, —N(R$^2$)$_2$, —OR$^2$, —(CH=CH)$_n$— W or a substituted or non-substituted phenyl group (herein, Q is bromine atom or chlorine atom, R$^2$ is phenyl group, naphthyl group or lower alkyl group having not more than 6 carbon atoms, n is an integer of 1 to 3, W is an aromatic group, heterocyclic group or a group represented by the following general formula (3)).

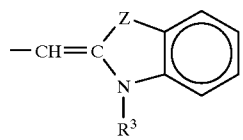
(3)

wherein Z is oxygen atom or sulfur atom; and R$^3$ is lower alkyl group or phenyl group.

In the general formula (2), the aromatic group or heterocyclic group represented by W may be further substituted by for example chlorine atom, bromine atom, phenyl group, a lower alkyl group having not more than 6 carbon atoms, nitro group, phenoxy group, alkoxy group, acetoxy group, acetyl group, amino group or alkylamino group.

Among these organic halides, a compound substituted by vinylhalomethyl-s-triazine as described in U.S. Pat. No. 3,987,037. This vinylhalomethyl-s-triazine compound is a photodegradable s-triazine compound comprising at least one trihalomethyl group and at least one group conjugated with triazine ring by way of ethylenic unsaturated bond, wherein —(CH=CH)$_n$—W is introduced into the R$^1$ of the compound represented by the general formula (2).

Specific examples of the trihalomethyl-s-triazine compound represented by the general formula (2) are as follows

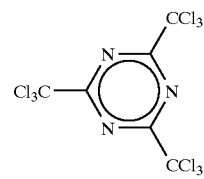

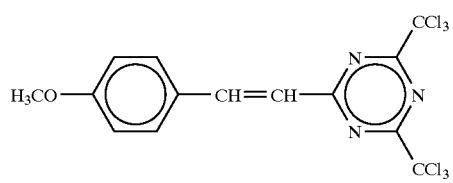

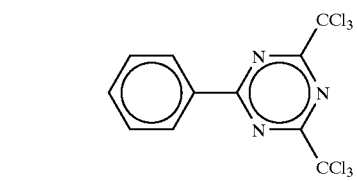

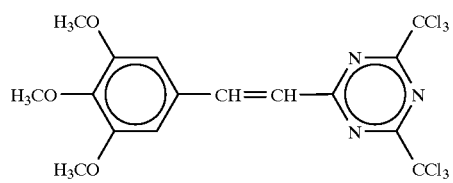

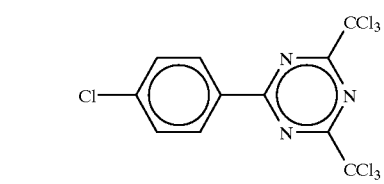

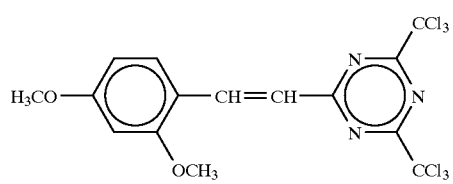

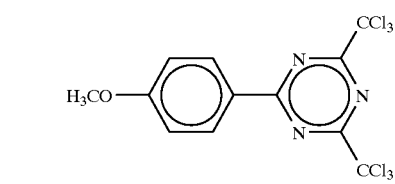

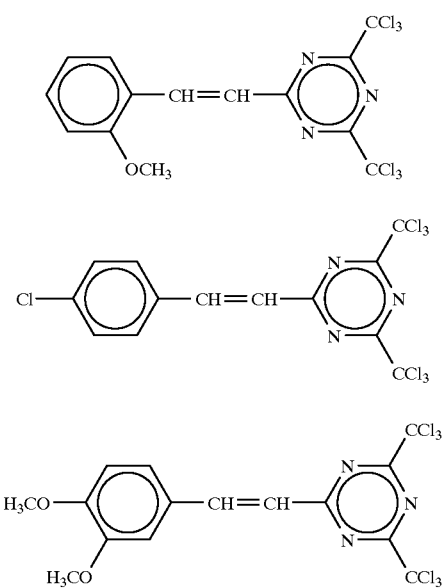

Specific examples of other radical-generating agents are as follows.

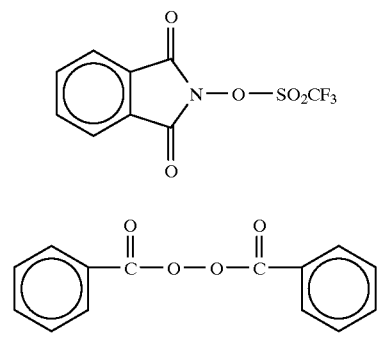

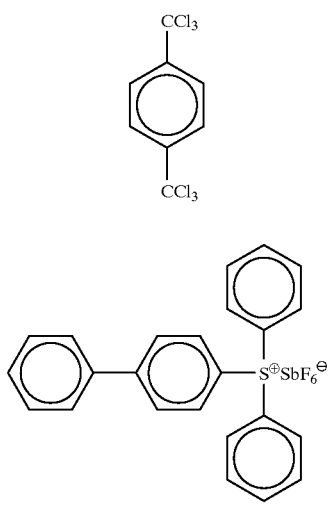

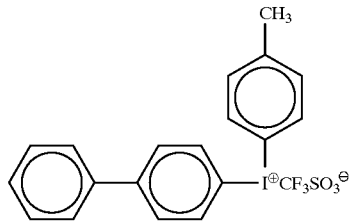

As for the acid-generating agent, an onium salt, a halogen-containing compound, an orthoquinone diazide compound, sulfone compound, sulfonic acid compound and nitrobenzyl compound can be used. Among them, the onium salt and orthoquinone diazide compound may be preferably used.

Specific examples of the onium salt are iodonium salt, sulfonium salt, phosphonium salt, diazonium salt and ammonium salts. Preferable examples of the onium salt are the compounds represented by the following chemical formula.

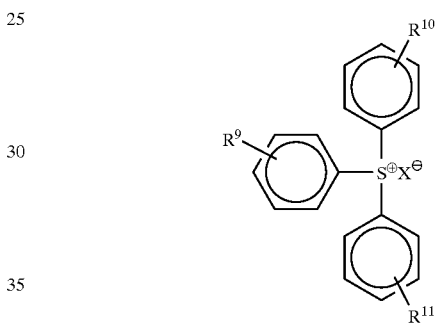

wherein $R^9$ to $R^{11}$ may be the same or different and are individually hydrogen atom, amino group, nitro group, cyano group, substituted or non-substituted alkyl or alkoxy group; X is $SbF_6$, $AsF_6$, $PF_6$, $BF_4$, $CF_3CO_2$, $ClO_4$, $CF_3SO_3$ or a group selected from the following compounds.

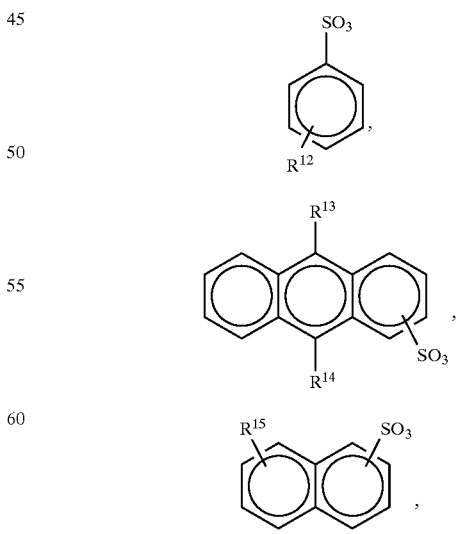

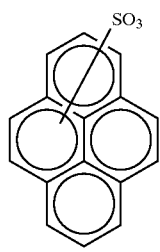

wherein $R^{12}$ is hydrogen atom, amino group, anilino group, substituted or non-substituted alkyl or alkoxy group; $R^{13}$ and $R^{14}$ may be the same or different and are individually substituted or non-substituted alkoxy group; and $R^{15}$ is hydrogen atom, amino group, anilino group, substituted or non-substituted alkyl or alkoxy group.

The following compound represented by the following chemical formula is also preferable as an onium salt.

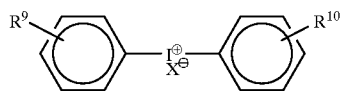

wherein $R^9$, $R^{10}$ and X are the same as defined above.

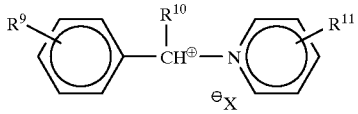

wherein $R^9$, $R^{10}$, $R^{11}$ and X are the same as defined above.

With respect to the halogen-containing compound, haloalkyl-containing hydrocarbon compounds and haloalkyl-containing heterocyclic compounds may be used. In particular, the compound represented by the following chemical formula is preferable.

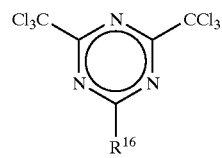

wherein $R^{16}$ represents trichloromethyl group, phenyl group, methoxyphenyl group, naphthyl group or methoxynaphthyl group.

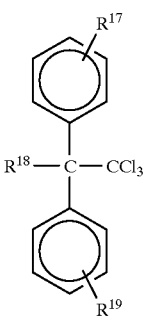

wherein $R^{17}$ to $R^{19}$ may be the same or different and are individually hydrogen atom, halogen atom, methyl, methoxy, or hydroxyl group.

As for the quinone diazide compound, a compound such as diazobenzoquinone compound or diazonaphthoquinone compound may be used. In particular, the compound represented by the following chemical formula is preferable.

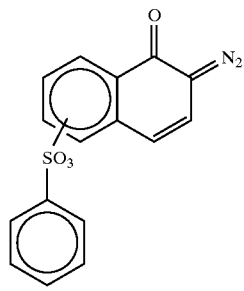

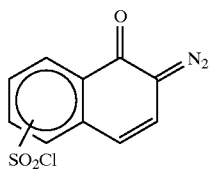

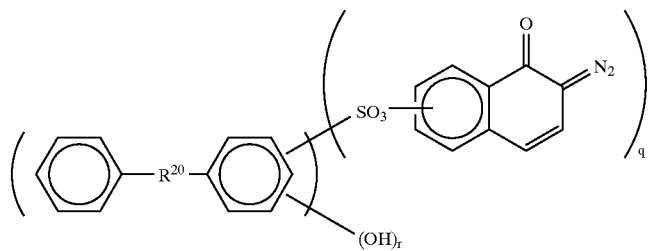

wherein $R^{20}$ is —$CH_2$—, —$C(CH_3)_2$—, —$C(=O)$— or —$SO_2$—; q is an integer of 1 to 6; r is an integer of 0 to 5; the total of q and r should be in the range of 1 to 6.

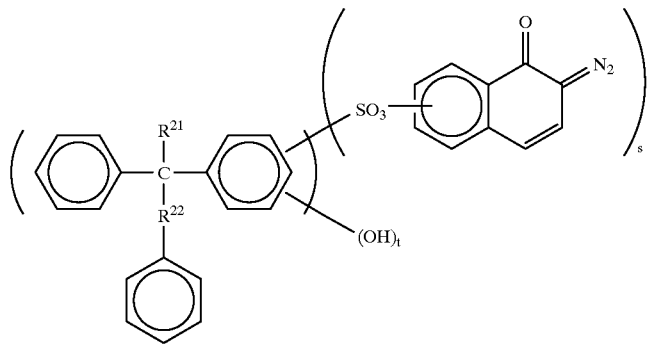

wherein $R^{21}$ is hydrogen atom or methyl; $R^{22}$ is —$CH_2$—, —$C(CH_3)_2$—, —$C(=O)$— or —$SO_2$—; s is an integer of 1 to 6; t is an integer of 0 to 5; the total of s and t should be in the range of 1 to 6.

As for the sulfone compound, a compound such as β-ketosulfone or β-sulfonyl sulfone may be used. In particular, the compound represented by the following chemical formula is preferable.

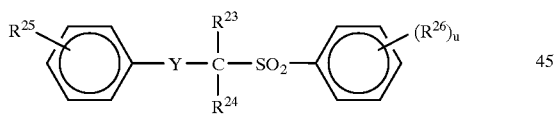

wherein $R^{23}$ to $R^{26}$ may be the same or different and are individually substituted or non-substituted alkyl group, or halogen atom; Y is —$C(=O)$— or —$SO_2$—; u is an integer of 0 to 3.

As for the nitrobenzyl compound, a compound such as nitrobenzyl sulfonate compound or dinitrobenzyl sulfonate compound may be used. In particular, the compound represented by the following chemical formula is preferable.

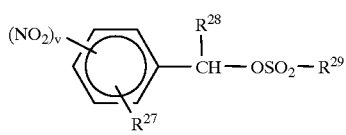

wherein $R^{27}$ is substituted or non-substituted alkyl group; $R^{28}$ is hydrogen atom or methyl group; $R^{29}$ is a group selected from the compounds shown below; v is an integer of 1 to 3.

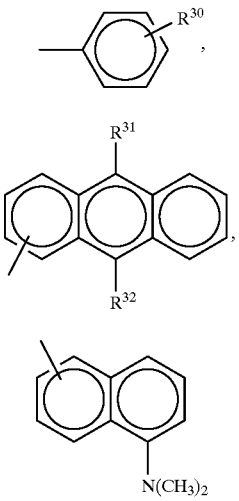

wherein $R^{30}$ is hydrogen atom or methyl group; and $R^{31}$ and $R^{32}$ may be the same or different and are individually substituted or non-substituted alkoxy group.

As for the sulfonic acid compound, a compound such as alkyl sulfonate, haloalkyl sulfonate, aryl sulfonate or iminosulfonate may be used. In particular, the compound represented by the following chemical formula is preferable.

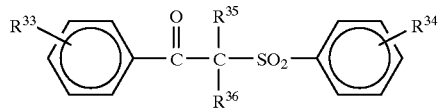

wherein $R^{33}$ and $R^{34}$ may be the same or different and are individually hydrogen atom, or substituted or non-substituted alkyl group; $R^{35}$ and $R^{36}$ may be the same or different and are individually hydrogen atom, or substituted or non-substituted alkyl group or aryl group.

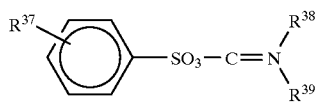

wherein $R^{37}$ is hydrogen atom, or substituted or non-substituted alkyl group; $R^{38}$ and $R^{39}$ may be the same or different and are individually substituted or non-substituted alkyl group or aryl group; $R^{38}$ and $R^{39}$ may be connected together to form a closed ring structure.

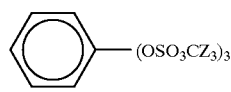

wherein Z is fluorine atom or chlorine atom.

The mixing ratio of the aforementioned radical-generating agent and acid-generating agent should preferably be 0.1 to 30 parts by weight, more preferably 1 to 10 parts by weight per 100 parts by weight of the polysilane represented by the general formula (1). Namely, if the mixing ratio of these sensitizers is less than 0.1 part by weight, the reaction between the polysilane and the radical or acid generated at the moment of light exposure may not be sufficiently proceeded, while if the mixing ratio of these sensitizers exceeds over 30 parts by weight, the solubility of the light exposed portion in an alkaline developing solution may tend to be lowered. If halomethyl-s-triazine is employed as a sensitizer, it is possible to obtain a silicon polymer composition having a sufficient sensitivity even if the mixing ratio of this compound is rather little, i.e. 0.01 to 3 parts by weight, more preferably 1 to 2 parts by weight per 100 parts by weight of the polysilane.

The silicon polymer composition of the second embodiment of this invention can be prepared by dissolving the aforementioned polysilane and the radical-generating agent or the acid-generating agent in an organic solvent of the same kind as in the case of the first embodiment described above.

The silicon polymer composition of the second embodiment of this invention can be suitably employed for the formation of a positive as well as a negative pattern, or for the formation of a colored film pattern or an insulating film pattern as explained hereinafter.

Next, a silicon polymer composition according to a third embodiment of this invention will be explained.

The polysilane to be used in this third embodiment of this invention is a compound having a repeating unit represented by the following general formula (4).

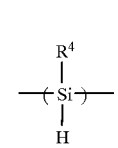

(4)

wherein $R^4$ is a substituted or non-substituted aryl group, or a substituted or non-substituted alkyl group.

Examples of the aryl group to be attached as a side chain to polysilane according to the third embodiment are phenyl group, naphthyl group and anthryl group. As for the alkyl group, methyl, ethyl, propyl and hexyl groups may be employed. The polysilane in this case may be a homopolymer or copolymer. The copolymer of polysilane may also contain a repeating unit other than that represented by the general formula (1) as long as the ratio of the repeating unit represented by the general formula (1) is 30% or more, preferably 50% or more. There is no limitation with respect to the molecular weight of polysilane, but generally the molecular weight of polysilane should preferably be in the range of 500 to 100,000, more preferably 1,000 to 10,000. Because, if the molecular weight of polysilane is less than 500, it may become difficult to form a coated film of excellent quality. On the other hand, if the molecular weight of polysilane exceeds over 100,000, the solubility in a solvent of the polysilane may be lowered. The following polysilanes may be employed in the silicon polymer composition of this third embodiment in addition to the polysilanes to be employed in the first and second embodiments of this invention.

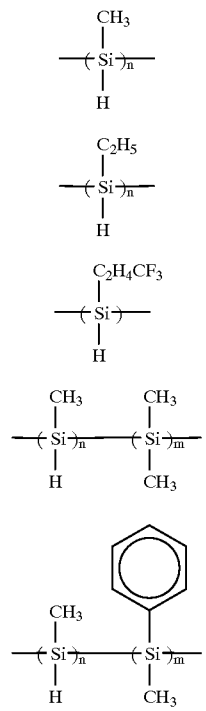

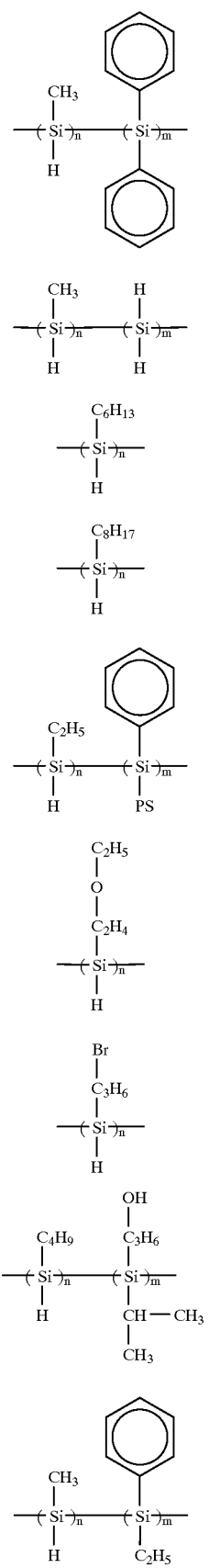
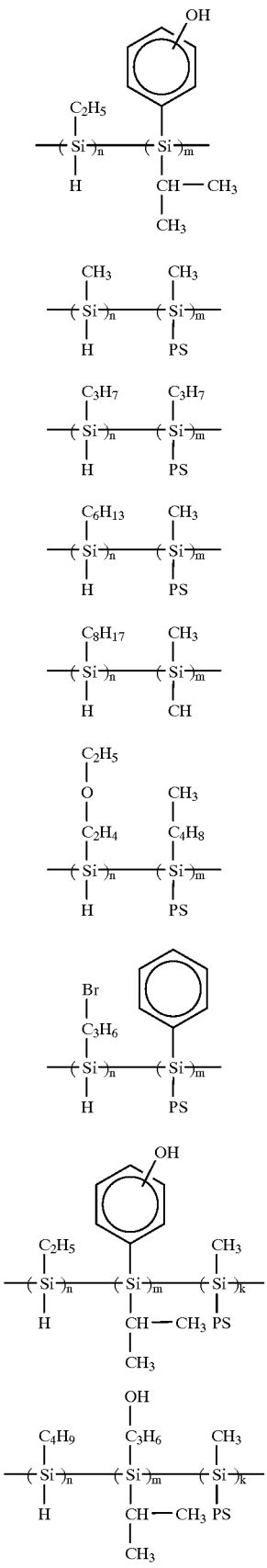

-continued

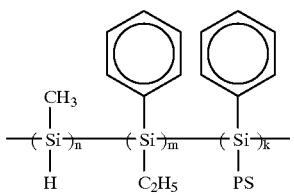

wherein n, m and k respectively represents a polymerization degree, and PS represents a polysilane skeleton.

When a silicon polymer composition according to the third embodiment which comprises a compound represented by the general formula (4) wherein a substituted or non-substituted aryl group such as phenyl group is introduced into $R^4$ of the general formula (4) is employed, an insulating film having a suitable degree of flexibility would be obtained, so that the generation of cracks in the film would be effectively prevented. However, since the silicon polymer composition according to the third embodiment contains therein $SiO_2$ fine powder and/or SiN fine powder and hence the cracking resistance thereof can be improved thereby as compared with the composition where only polysilane is contained therein, the $R^4$ may not be the aforementioned aryl group, but a substituted or non-substituted alkyl group.

Although there is not any particular limitation with respect to the $SiO_2$ fine powder and SiN fine powder to be employed in the third embodiment, those having a particle diameter of 10 μm or less are preferable in view of obtaining a coated layer which is excellent in surface flatness and in uniformity. More preferable particle diameter of these fine powders is 0.1 μm or less.

The mixing ratio of these fine powders in the third embodiment of this invention is 1 to 70 wt. %, more preferably 10 to 50 wt. % based the weight of polysilane. If this mixing ratio is less than 1 wt. %, it may be difficult to obtain an insulating film having high density and high resistance. On the other hand, if the mixing ratio exceeds over 70 wt. %, it may be difficult to obtain a coated film having an excellent quality.

The silicon polymer composition according to the third embodiment may contain an organometallic compound. Namely, the organometallic compound in this case acts as a cross-linking agent for the polysilane, so that when the silicon polymer composition is formed into an insulating film, the adhesivity of the insulating film onto a substrate would be improved. Moreover, when the film of silicon polymer composition is subjected to a light exposure treatment prior to the heat-drying treatment of the film in the formation of an insulating film, the organometallic compound absorbs ultraviolet rays to facilitate the ring-opening thereby promoting the bonding with silanolic hydroxyl group (Si—OH), i.e. the organometallic compound also acts as a catalyst for enhancing the light sensitivity of the film as well as for expanding the exposure wave range of the film.

The mixing ratio of the organometallic compound should preferably be about 0.1 to 30 wt. % based the weight of polysilane. If this mixing ratio is less than 0.1 wt. %, it may be difficult to promote the cross-linking of the polysilane. On the other hand, if the mixing ratio exceeds over 30 wt. %, it may be difficult to obtain a coated film having an excellent quality.

Examples of the organometallic compound are those wherein an organic group is directly bonded to a metal such as aluminum, titanium, chromium, zirconium, copper, iron, manganese, nickel, vanadium and cobalt, or a complex compound of any of these metals. Among these organometallic compounds, an organozirconium compound, an organoaluminum compound and an organotitanium compound are preferable. Examples of ligand useful in the formation of the aforementioned organic groups and complex compounds are (1) alkoxyl group; (2) phenoxy group; (3) acyloxy ligand; (4) β-diketone ligand; and (5) o-carbonyl phenolate ligand. Specifically, organometallic compounds where the substituents or ligands shown below are bonded to a metallic atom are preferable.

(1) Alkoxyl group:

Alkoxyl groups having 1 to 10 carbon atoms are preferable. For example, methoxy group, isopropoxy group or pentoxy group may be preferably employed.

(2) Phenoxy group:

For example, phenoxy group, o-methylphenoxy group, o-methoxyphenoxy group, p-nitrophenoxy group and 2,6-dimethylphenoxy group may be preferably employed.

(3) Acyloxy ligand:

For example, acetato, propionato, isopropinato, butylato, stearato, ethylacetoacetato, propylacetoacetato, butylacetoacetato, diethylmalato and dipivaloylmethanato may be preferably employed.

(4) β-diketone ligand:

For example, acetylacetonato, trifluoroacetyl acetonato, hexafluoroacetyl acetonato and ligands of (C-1) to (C-3) shown below may be preferably employed.

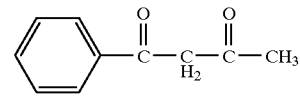
(C-1)

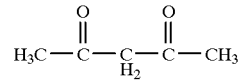
(C-2)

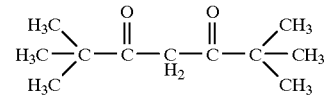
(C-3)

(5) o-carbonyl phenolate ligand:

For example, salicylaldehyde may be preferably employed.

Examples of organoaluminum compound are trismethoxy aluminum, triethoxy aluminum, triisopropoxy aluminum, trisphenoxy aluminum, trisparamethylphenoxy aluminum, isopropoxydiethoxy aluminum, trisbutoxy aluminum, trisacetoxy aluminum, trisisouropionato aluminum, trisacetyl acetonato aluminum, tristrifluoroacetyl acetonato aluminum, trishexafluoroacetyl acetonato aluminum, trisethylacetyl acetonato aluminum, trisdiethylfumarato aluminum, trispropylacetyl acetonato aluminum, trisbutyl acetoacetanato aluminum, trisdipivaloylmetanato aluminum, diacetylacetonatodipivaloylmetanato aluminum, and the compounds of (D-1) to (D-6) shown below.

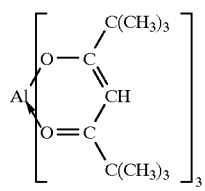
(D-1)

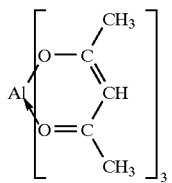
(D-2)

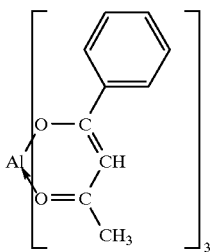
(D-3)

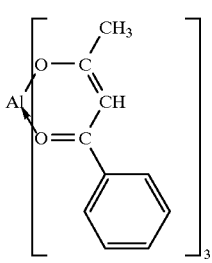
(D-4)

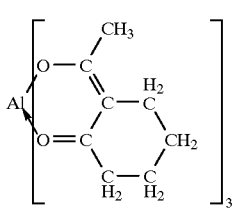
(D-5)

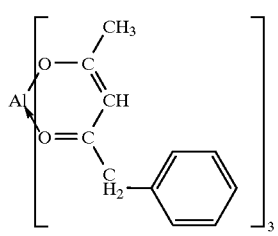
(D-6)

The silicon polymer composition according to the third embodiment may contain the aforementioned radical-generating agent or acid-generating agent as a sensitizer to be utilized at the occasion of the light exposure of the polymer film prior to the heat-drying of the polymer film or at the occasion of forming a pattern in the process of forming an insulating film for example.

In this case, the mixing ratio of the radical-generating agent or acid-generating agent should preferably be 0.1 to 30 parts by weight, more preferably 1 to 10 parts by weight per 100 parts by weight of the polysilane. If the mixing ratio of the sensitizer is less than 0.1 part by weight, the reaction between the radical or acid generating by the light exposure and the polysilane may become insufficient. On the other hand, if the mixing ratio of the sensitizer exceeds over 30 parts by weight, the solubility of the exposed portion of the polymer film in an alkaline developing solution in the formation of a positive pattern would be deteriorated. If halomethyl-s-triazine is employed as a sensitizer, it is possible to obtain a silicon polymer composition having a sufficient sensitivity even if the mixing ratio of this compound is rather little, i.e. 0.01 to 3 parts by weight, more preferably 1 to 2 parts by weight per 100 parts by weight of the polysilane.

The silicon polymer composition of the third embodiment of this invention can be prepared by dissolving the aforementioned polysilane and at least either one of $SiO_2$ fine powder and SiN fine powder in a suitable solvent together with if required an organometallic compound, a radical-generating agent or an acid-generating agent. Examples of the organic solvent useful in this case are toluene, xylene, methylethyl ketone, tetrahydrofuran, ethyl acetate cellosolve, butyrolactone and butyl lactate. These compounds may be used singly or in combination. These fine powders should preferably be dispersed prior to use in any one of silica sol, surfactants or dispersants having a polar group or a functional group.

When an insulating film is to be formed using these silicon polymer compositions, a solution containing any one of these silicon polymer compositions is prepared and then the solution is coated on the surface of a predetermined substrate by way of a spin-coating method for example, and then the coated layer is dried to evaporate a solvent at a temperature of 50 to 150° C. thereby obtaining an organosilane compound film comprising mainly of polysilane.

As for the substrate, a transparent substrate comprising a translucent glass or resin, a semiconductor substrate provided on the surface thereof with an interconnecting wiring, or a glass substrate provided on the surface thereof with an interconnecting wiring may be employed.

The film thus coated on the substrate is then heat-treated in an oxygen-containing atmosphere to turn it into a three-dimensional crosslinking structure via oxygen atom thereby forming an insulating film. There is not any particular restriction as to the kind of the oxygen-containing atmosphere as long as it is a gas atmosphere containing oxygen, preferably 1% or more of oxygen.

The aforementioned heat treatment should preferably be performed at a temperature of 100 to 600° C. If the temperature of the heat treatment is less than 100° C., a sufficient oxidation can not be realized, so that the film coated on the substrate can not be satisfactorily turned into a three-dimensional crosslinking structure via oxygen atom. On the other hand, if the temperature of the heat treatment exceeds over 600° C., the volume shrinkage of the film becomes too large to prevent the generation of cracks in the insulating film to be formed. Therefore, a preferable temperature range of the heat treatment is 200 to 500° C.

Since the insulating film to be obtained by making use of the silicon polymer composition of third embodiment is constituted by a vitrified silicon matrix having a three-dimensional crosslinking structure via oxygen atom, or a three-dimensional Si—O—Si bond structure, the adhesivity to the substrate as well as the heat resistance of the insulating film are very excellent. Moreover, since the silicon polymer composition of the third embodiment contains at least either one of $SiO_2$ fine powder and SiN fine powder, it is possible with the employment of this composition to enhance the density of a film to be formed, and hence to produce an insulating film which is excellent in electric resistance, mechanical strength and dielectric breakdown strength. Namely, by being mixed with $SiO_2$ fine powder, the density of the resultant insulating film can be enhanced and hence electric resistance, mechanical strength and dielectric breakdown strength of the insulating film will be improved. Further, by being mixed with SiN fine powder, the density of the resultant insulating film can be enhanced and hence electric resistance, mechanical strength, ion-trapping property and $H_2O$ barrier property of the insulating film will be improved.

After a film of silicon polymer composition is formed by coating a solution containing the aforementioned silicon polymer composition on a substrate and before this film is heat-treated, the entire surface of the film should preferably be exposed to ultraviolet rays in an oxygen-containing atmosphere. The wavelength of ultraviolet rays to be employed in this light exposure process may be about 150 to 400 nm, more preferable range of the wavelength of ultraviolet rays being 200 to 300 nm. The irradiation dosage of ultraviolet rays is 10 mJ to 10J, more preferably 100 mJ to 3J.

With this entire light exposure of the film, the polysilane in the film is caused to decompose, thus generating a silanolic hydroxyl group (Si—OH) having a high acidity. When this organosilane compound is heated after this light exposure, a siloxane bond (Si—O—Si) can be promptly formed in high crosslinking density throughout the film. Therefore, this heat treatment can be performed at a lower temperature than that to be employed when such a light exposure is not performed. At the same time, it is possible to easily form an insulating film which is excellent in adhesion to a substrate and in heat resistance.

The organosilane compound film after this entire light exposure treatment may be immersed in a metal alkoxide sol comprising a metal such as silicon, zirconium, aluminum or titanium before the aforementioned heat treatment, thus allowing the silanolic hydroxyl group (Si—OH) generated by the aforementioned entire light exposure to be bonded with a metal such as silicon, zirconium, aluminum or titanium. As a result, it is possible with a subsequent heat treatment to obtain an insulating film which is extremely high in crosslinking density and further improved in adhesion to a substrate and in heat resistance.

It is also possible to form a patterned insulating film by making use of the silicon polymer composition of the third embodiment. Methods of forming a positive type pattern as well as a negative type pattern will be explained in details as follows.

A positive type insulating film pattern may be formed by using a polysilane where $R^4$ in the general formula (4) is a substituted or non-substituted aryl group. Namely, such a polysilane and at least either one of $SiO_2$ fine powder and SiN fine powder are mixed homogeneously together with if required an organometallic compound in the same manner as mentioned above to form a silicon polymer composition, which is then dissolved in a solvent and coated on the surface of a substrate to form an organosilane compound film.

Then, a predetermined portion of the organosilane compound film is irradiated with ultraviolet rays thereby performing a selective exposure. This patterning light exposure can be performed in the same conditions as described above. The wavelength of ultraviolet rays to be employed in this light exposure process may be about 150 to 400 nm, more preferable range of the wavelength of ultraviolet rays being 200 to 300 nm. The irradiation dosage of ultraviolet rays is 10 mJ to 10J, more preferably 100 mJ to 3J.

After this patterning exposure, the organosilane compound film is developed using an aqueous alkaline solution to selectively remove the irradiated portions of the film. Examples of aqueous alkaline solution to be employed in this case are an organic alkaline solution such as tetramethylammonium hydroxide and choline; an inorganic alkaline solution such as KOH and NaOH. It is also possible to eliminate the light-exposed portions by making use of an aqueous hydrofluoric acid solution. After the development, the organosilane compound film may be optionally washed with pure water.

Subsequently, the entire surface of the organosilane compound film is, if required, exposed to light, and then heat-treated at a temperature of 100 to 600° C., preferably 200 to 500° C. in an oxygen-containing atmosphere to obtain a patterned insulating film. This entire exposure may be performed in the same conditions as in the aforementioned patterning light exposure.

When the organosilane compound film is selectively exposed to light in the formation of this positive type pattern, the polysilane in the film is caused to decompose, thus allowing the exposed portion to be selectively formed with a silanolic hydroxyl group (Si—OH) having a high acidity. When this organosilane compound film is developed after the light exposure, with an aqueous alkaline solution, the light-exposed portion of the organosilane compound film is selectively dissolved and removed whereby forming a positive type pattern. Subsequently, the surface of the organosilane compound film is, if required, entirely exposed to light, whereby forming a silanolic hydroxyl group (Si—OH) all over the surface of the film. Thereafter, the positive type pattern is heat-treated to form a siloxane bond (Si—O—Si) in high crosslinking density throughout the pattern. As a result, a positive type pattern which is formed of a glass matrix, and excellent in adhesion onto a substrate and in heat resistance can be easily formed in high precision.

On the other hand, a negative type insulating film pattern may be formed by using not only a polysilane where $R^4$ in the general formula (4) is an aryl group, but also a polysilane where $R^4$ in the general formula (4) is an alkyl group. In the case of forming a negative type pattern, an organosilane compound film is selectively exposed to light and then heated, followed by the development with an organic solvent, thereby selectively dissolving and removing the non-exposed portion of the film.

The patterning light exposure can be performed in the same conditions as described above. Namely, the wavelength of ultraviolet rays to be employed in this light exposure process may be about 150 to 400 nm, more preferable range of the wavelength of ultraviolet rays being 200 to 300 nm. The irradiation dosage of ultraviolet rays is 10 mJ to 10J, more preferably 100 mJ to 3J.

The heat treatment before development should preferably be performed at a temperature of 100 to 150° C. depending on the heating period of time. If the heating temperature is less than 100° C., the cross-linking at the light-exposed portion of the film where the silanolic hydroxyl group is formed would become insufficient. On the contrary, if the heating temperature exceeds over 150° C., the crosslinking of the silicon polymer may take place even at the non-exposure portion of the film. In either case, it would be difficult to carry out the patterning of an organosilane compound film in high precision.

Organic solvents useful in this case are polar solvents including an aromatic solvent such as toluene and xylene; an alcoholic solvent such as methanol and ethanol; ketonic solvent such as acetone and methylethyl ketone; an ester solvent such as methyl acetate, ethyl acetate and butyl acetate. When a polysilane where $R^4$ in the general formula (4) is a substituted or non-substituted aryl group is employed, a development in an aqueous alkaline solution or in an aqueous hydrofluoric acid solution can be performed provided that the organosilane compound film is irradiated with ultraviolet rays to generate a silanolic hydroxyl group prior to the development.

The organosilane compound film after the development is then heat-treated at a temperature of 100 to 600° C., preferably 200 to 500° C. in an oxygen-containing atmosphere to obtain a patterned insulating film.

In the formation of the aforementioned negative type pattern, the organosilane compound film is selectively exposed to light to decompose the polysilane in the film, thus allowing the exposed portion to be selectively formed with a silanolic hydroxyl group (Si—OH). When this organosilane compound film is heat-treated at a relatively low temperature (for example, 100 to 150° C.) after the light exposure, the silanolic hydroxyl group (Si—OH) can be selectively crosslinked. As a result, a siloxane bond (Si—O—Si) of such a high crosslinking density that makes it insoluble to a solvent will be formed in the light-exposed portion of the film, thus bringing about a selective solubility between the light-exposed portion and non-exposure portion. Then, through a development with an organic solvent, the non-exposure portion can be selectively dissolved and removed whereby forming a negative type pattern. Thereafter, the organosilane compound film thus patterned is heat-treated at a relatively high temperature (for example, 200 to 500° C.) thus forming a siloxane bond (Si—O—Si) of high crosslinking density throughout the pattern. As a result, an insulating film pattern which is formed of a glass matrix, and excellent in adhesion onto a substrate and in heat resistance can be easily formed.

The negative type pattern is advantageous over the positive type pattern as far as the shape of pattern is concerned. However, the positive type pattern is advantageous over the negative type pattern in the respect that an aqueous alkaline solution which is less harmful to environment can be employed.

The silicon polymer composition of the third embodiment is featured in that it comprises a polysilane containing hydrogen atom directly attached in the form of a side chain to the silicon atom of the backbone chain, and at least one of $SiO_2$ fine powder and SiN fine powder. Therefore, it is possible to produce an insulating film which is constituted by a vitrified silicon matrix having a three-dimensional Si—O—Si bond structure, and has at least one of $SiO_2$ fine powder and SiN fine powder impregnated in the matrix. Therefore, the insulating film thus obtained is of high density due to the inclusion of the aforementioned fine powder and is high in heat resistance and in mechanical strength. Moreover, when the insulating film is mixed with $SiO_2$ fine powder, the dielectric breakdown strength of thereof will be improved. Further, when SiN fine powder is mixed into the insulating film, the ion-trapping property and $H_2O$ barrier property of the insulating film will be improved.

The method of forming a pattern according to fourth to seventh embodiments of this invention will be explained as follows.

According to fourth and fifth embodiments, a positive or negative type pattern can be obtained by subjecting an organosilane compound film comprising a polysilane having a repeating unit represented by the following general formula (1) to a selective light exposure, and then further subjecting the resultant film to the predetermined procedures.

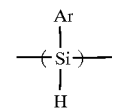

(1)

wherein Ar is a substituted or non-substituted aryl group.

Namely, in the method of forming a pattern according these embodiments, the same polysilanes as employed in the first or second embodiment may be employed. First of all, a solution containing any one of the polysilanes dissolved in an organic solvent is coated on the surface of a predetermined substrate by way of a spin-coating method for example, and then the coated layer is dried, thereby obtaining an organosilane compound film. As for the organic solvent useful in this case, various kinds of solvents as explained above such as toluene, xylene, etc. can be used.

As for the substrate, a semiconductor substrate provided on the surface thereof with an interconnecting wiring, or a glass substrate provided on the surface thereof with an interconnecting wiring may be employed.

Any of the crosslinking agent, the radical-generating agent or the acid-generating agent as described above may be mixed into the polysilane preferably in the same mixing ratios as explained above.

Next, a method of forming a positive type pattern that is the fourth embodiment will be explained as follows.

In this case, an alkali-soluble resin that can be obtained by copolymerizing the monomer represented by the general formula (1) with a monomer having phenolic hydroxyl group, a carboxylic acid residue or ether bond may be co-used in the silicon polymer composition. Followings are examples of alkali-soluble resin useful in this case.

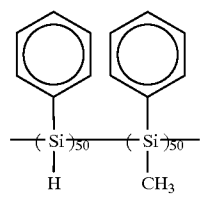

(B-1)

-continued (B-2) 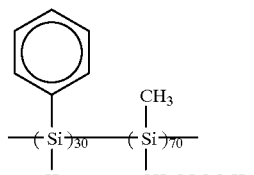

(B-3) 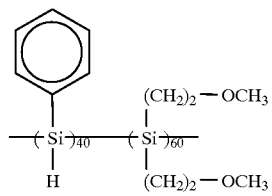

(B-4) 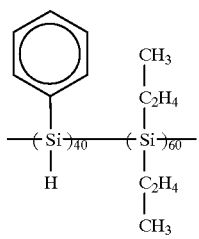

(B-5) 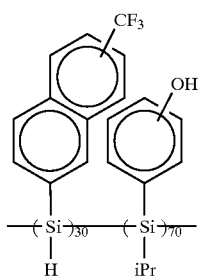

(B-6) 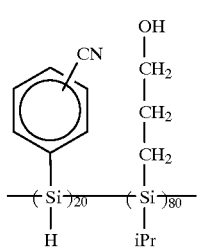

(B-7) 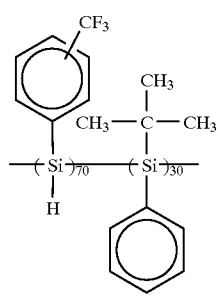

-continued (B-8) 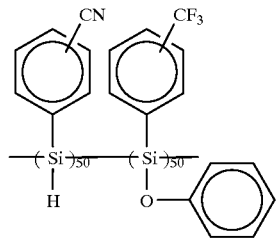

In the forming of an insulating film pattern, the mixing ratio of the aforementioned alkali-soluble resin should preferably be set to 95 wt. % or less. This is because, if the mixing ratio of the alkali-soluble resin exceeds over 95 wt. %, the formation of insulating film pattern of high precision would become difficult.

A predetermined region of the organosilane compound film formed on the substrate is selectively exposed to an actinic radiation. The wavelength of ultraviolet rays to be employed in this light exposure process may be about 150 to 400 nm, more preferable range of the wavelength of ultraviolet rays being 200 to 300 nm. The irradiation dosage of ultraviolet rays is 10 mJ to 10J, more preferably 100 mJ to 3J.

After this patterning light exposure, the organosilane compound film is post-baked at a temperature of 50 to 150° C. if desired and then developed using an aqueous alkaline solution or an aqueous hydrofluoric acid solution to selectively remove the irradiated portions of the film. After the development, the organosilane compound film may be optionally washed with water.

Subsequently, the entire surface of the organosilane compound film is, if required, exposed to light, and then heat-treated at a temperature of 100 to 600° C., preferably 200 to 500° C. This entire exposure may be performed in the same conditions as in the aforementioned patterning light exposure.

The organosilane compound film after this entire exposure treatment may be immersed in a metal alkoxide sol comprising a metal such as zirconium, aluminum, titanium or silicon before the aforementioned heat treatment.

The formation of the aforementioned positive type pattern can be carried out in the same mechanism as in the case where a silicon polymer composition of the first or second embodiment is used. When the light exposure is performed on the entire surface of the organosilane compound film, a silanolic hydroxyl group (Si—OH) is formed all over the film. Therefore, when this organosilane compound film is heat-treated after the light exposure, a siloxane bond (Si—O—Si) of high crosslinking density can be formed all over the surface of the film. As a result, an insulating film pattern which is formed of a glass matrix, and excellent in adhesion onto a substrate and in heat resistance can be easily formed.

The organosilane compound film after this entire exposure treatment may be immersed in a metal alkoxide sol solution before the aforementioned heat treatment, thus allowing the silanolic hydroxyl group (Si—OH) generated by the aforementioned entire exposure to be bonded with a metal such as zirconium, aluminum, titanium or silicon. As a result, it is possible, through a subsequent heat treatment, to obtain an insulating film which is extremely high in crosslinking density and further improved in adhesion to a substrate and in heat resistance.

On the other hand, in the case of forming a negative type pattern that is the fifth embodiment, an organosilane compound film is selectively exposed to light and then heated, followed by the development with an organic solvent, thereby selectively dissolving and removing the non-exposed portion of the film.

In the formation of this negative type pattern, an organometallic compound as employed in the third embodiment may be mixed in a silicon polymer composition to be employed.

The mixing ratio of the organometallic compound should preferably be about 0.1 to 30 wt. % based the weight of polysilane. If this mixing ratio is less than 0.1 wt. %, it may be difficult to promote the cross-linking of the polysilane. On the other hand, if the mixing ratio exceeds over 30 wt. %, it may be difficult to obtain a coated film having an excellent quality.

The patterning light exposure can be performed in the same conditions as described above. Namely, the wavelength of ultraviolet rays to be employed in this light exposure process may be about 150 to 400 nm, more preferable range of the wavelength of ultraviolet rays being 200 to 300 nm. The irradiation dosage of ultraviolet rays is 10 mJ to 10J, more preferably 100 mJ to 3J.

The heat treatment after the development should preferably be performed at a temperature of 100 to 150° C. depending on the heating period of time. If the heating temperature is less than 100° C., the crosslinking at the light-exposed portion of the film where the silanolic hydroxyl group is formed would become insufficient. On the contrary, if the heating temperature exceeds over 150° C., the crosslinking of the silicon polymer may take place even at the non-exposure portion of the film. In either case, it would be difficult to carry out the patterning of an organosilane compound film in high precision.

The organosilane compound film after the aforementioned heat treatment is developed using the same kinds of organic solvent as explained with reference to the third embodiment thereby selectively dissolving and removing the non-exposure portion to form a pattern. The organosilane compound film may heat-treated at a temperature of 100 to 600° C., preferably 200 to 500° C. After the formation of pattern, the organosilane compound film is entirely heat-treated at a relatively high temperature (for example, 200 to 500° C.) to form a siloxane bond (Si—O—Si) of high crosslinking density all over the film. As a result, an insulating film pattern which is formed of a glass matrix, and excellent in adhesion onto a substrate and in heat resistance can be easily formed in high precision.

The method of forming a pattern according to the present invention has been explained with reference to the cases where a positive insulating film pattern as well as a negative insulating film pattern are formed. However, the method forming a pattern according to this invention is not restricted to them, but may also be applicable to the formation of a patterned functional film wherein an organosilane compound film is selectively exposed to an actinic radiation, and then the light-exposed portion of the organosilane compound film is impregnated selectively with a predetermined functional material.

In the followings, a method of forming a color pattern that is the sixth embodiment making use of a color component as a functional material will be explained.

In this case, a silicon polymer composition comprising a polysilane having a repeating unit represented by the fol lowing general formula (1) and a radical-generating agent or an acid-generating agent can be employed.

wherein Ar is a substituted or non-substituted aryl group.

Namely, the silicon polymer composition to be employed in this case is the same as employed in the aforementioned second embodiment. Likewise, the same kinds of radical-generating agent and acid-generating agent in the same ratio as employed in the second embodiment may be employed. In the formation of a pattern using this silicon polymer composition, a solution containing the aforementioned composition is coated on the surface of a predetermined substrate by way of a spin-coating method for example, and then the coated layer is dried, thereby obtaining an organosilane compound film.

As for the substrate, a semiconductor substrate provided on the surface thereof with an interconnecting wiring, or a glass substrate provided on the surface thereof with an interconnecting wiring may be employed.

Subsequently, a predetermined region of the organosilane compound film formed on the substrate is selectively irradiated with an actinic radiation, and then the resultant organosilane compound film is immersed into a solution containing a color component to selectively coloring the light-exposed portion.

The light exposure can be performed by irradiating ultraviolet rays such as Deep UV through a predetermined mask pattern.

As for the color component, a basic dye, an oil-soluble dye, a disperse dye or a pigment may be used.

Specific examples of the basic dye are Basic Red 12, Basic Red 27, Basic Violet 7, Basic Violet 10, Basic Violet 40, Basic Blue 1, Basic Blue 7, Basic Blue 26, Basic Blue 77, Basic Green 1 and Basic Yellow 21.

Specific examples of the oil-soluble dye are Solvent Red 125, Solvent Red 132, Solvent Red 83, Solvent Red 109, Solvent Blue 67, Solvent Blue 25, Solvent Yellow 25, Solvent Yellow 89 and Solvent Yellow 149.

Specific examples of the disperse dye are Disperse Red 60, Disperse Red 72, Disperse Blue 56, Disperse Blue 60, and Disperse Yellow 60.

Specific examples of the pigment are Pigment Red 220, Pigment Red 221, Pigment Red 53:1, Pigment Blue 15:3, Pigment Blue 60, Pigment Green 7 and Pigment Violet 37.

As for the solvent useful in preparing a solution containing these color component, water or alcohol may be used. The concentration of these color component in the solution should preferably be about 1 to 10 wt. %. If this concentration is less than 1 wt. %, it would be difficult to obtain a color layer having a sufficient color tone. On the other hand, if this concentration exceeds over 10 wt. %, it may give rise to the non-uniformity of color.

In the preparation of the solution containing a color component, a water-soluble organic solvent such as acetonitrile, dioxane or tetrahydrofuran may be co-used to shorten the coloring time. When a water-soluble organic solvent is to be employed however, the mixing ratio thereof should preferably be 20 wt. % or less. Because, if the content of the water-soluble organic solvent in the solution is too large, the eluation of film during the coloring step may be promoted.

The organosilane compound film after the impregnation of color component is heat-dried to cure the film, thereby forming a color layer. This heat-drying step may be preferably performed at a temperature of 50 to 150° C. for 5 to 30 minutes.

According to this method of forming a pattern, when an actinic radiation is irradiated onto a predetermined region of the organosilane compound film comprising the polysilane having a repeating unit represented by the general formula (1) and a radical-generating agent such as trihalomethyl-s-triazine and/or an acid-generating agent, the radical-generating agent and/or the acid-generating agent at the light-exposed portion of the organosilane compound film are decomposed, thus generating a radical and/or an acid. As a result, these radical and acid function as a catalyst, inducing the cut off of the Si—Si backbone chain of the polysilane having a repeating unit represented by the general formula (1) or activating the Si—H bond at the light-exposed portion of the organosilane compound film, and hence the polysilane is disintegrated, selectively forming a stable silanolic hydroxyl group (Si—OH). Therefore, this method is very effective in enhancing the sensitivity of the film to the actinic radiation at the occasion of light exposure.

When this organosilane compound film is immersed in a solution containing a color component after the light exposure, the light-exposed portion where three silanolic hydroxyl groups are generated per silicon atom of the backbone chain can be selectively colored through a selective adsorption of the color component within a relatively short time. Thereafter the organosilane compound film is dried to remove the solvent in the solution of color component and at the same time to allow the silanolic hydroxyl groups to react with each other, thus forming a three-dimensional silicon matrix formed of siloxane bond (Si—O—Si) of high crosslinking density, since three silanolic hydroxyl groups are generated per silicon atom of the backbone chain as mentioned above.

Therefore, it is possible to obtain a color film containing a color component in a silicon-based matrix and having a smooth surface excellent in durability and mechanical strength.

These light exposure and coloring steps are repeated for each of three colors, i.e. R, G and B to obtain a multi-colored layer.

In the following seventh embodiment, an example where $SiO_2$ fine powder or SiN fine powder is employed in place of a color component is explained. Namely, when at least either one of $SiO_2$ fine powder and SiN fine powder is impregnated into the light-exposed portion of an organosilane compound film, an insulating film pattern of high electric resistance and high mechanical strength can be obtained. In this case, a polysilane having a repeating unit represented by the following general formula (4) can be employed in addition to the polysilanes to be employed in the aforementioned first and second embodiments.

(4)

wherein $R^4$ is a substituted or non-substituted aryl group, or a substituted or non-substituted alkyl group.

When a film containing this kind of polysilane is immersed in a solution containing fine powder of $SiO_2$ for example after a predetermined portion of the film is irradiated with an actinic radiation, the fine powder can be selectively impregnated into the actinic radiation-irradiated portion of the film. Namely, the Si—Si bond of polysilane in general can be cut off, as the polysilane absorb the energy of ultraviolet rays, thereby allowing the cut portion of polysilane to subsequently take up oxygen or water in the air atmosphere thereby oxidizing the polysilane and forming a couple of Si—OH bonds per silicon atom. As a result, the fine powder can be selectively adsorbed onto the actinic radiation-irradiated portion of the polysilane through the interaction between the silanolic hydroxyl group (Si—OH) and the fine powder.

In the polysilane having a repeating unit represented by the aforementioned general formula (4), the hydrogen atom directly attached as a side chain to one of silicon atom of polysilane is also converted to silanolic hydroxyl group as the polysilane is irradiated by an energy of an actinic radiation. Therefore, the sensitivity of the polysilane to an actinic radiation can be further enhanced, and at the same time since three silanolic hydroxyl groups per silicon atom can be produced, the adsorption rate of the fine powder can be extremely accelerated, thus making it possible to greatly shorten the time required for the adsorption of the powder.

As for the kind of the $SiO_2$ fine powder or SiN fine powder, the same kinds of these fine powders as employed in the third embodiment can be used. The particle diameter of these fine powders should preferably be 10 μm or less for the same reason as explained above. More preferable particle diameter of these fine powders is 0.1 μm or less.

As for the solvent useful in preparing a solution containing these fine powders, water or alcohol may be used. The concentration of these fine powders in the solution should preferably be about 1 to 10 wt. %. If this concentration is less than 1 wt. %, it would be difficult to obtain an insulating film having a sufficient content of these fine powders. On the other hand, if this concentration exceeds over 10 wt. %, it may give rise to the non-uniformity in composition of the insulating film.

In the preparation of the solution containing these fine powders, a hydrophilic organic solvent such as acetonitrile, dioxane or tetrahydrofuran may be co-used to accelerate the adsorption rate of the fine powder in the impregnation step. When a hydrophilic organic solvent is to be employed however, the mixing ratio thereof should preferably be 20 wt. % or less. Because, if the content of the hydrophilic organic solvent in the solution is too large, the eluation of film during the coloring step may be promoted.

If a functional material is to be impregnated into the light-exposed portion of an organosilane compound as described above, a sol solution of metal alkoxide or a decomposition product of metal alkoxide may be used for mixing therein a color component or fine powder. In this case, the metal alkoxide may be a metalloid alkoxide. For example, such a sol solution can be prepared by the steps of dissolving or dispersing an ethoxide of a metal such as silicon, aluminum, zirconium or titanium in a mixed solvent comprising alcohol and water to obtain a mixture, adding an acid to the mixture to turn it into a sol, and mixing a color component or $SiO_2$ fine powder into the sol. The mixing amount of the metal alkoxide may be suitably determined within a range which would not badly affect the fluidity of the sol solution, e.g., 70 wt. % or less based on the solvent.

After an actinic radiation is irradiated onto a predetermined region of an organosilane compound film comprising the aforementioned polysilane as a main component, the organosilane compound film is immersed in a sol containing a color component or $SiO_2$ fine powder mentioned above, thereby allowing the color component or $SiO_2$ fine powder to be impregnated into the irradiated portion of the organosilane compound film. As a result, even if the dispersibility of the color component or fine powder in water or alcohol is relatively poor, the color component or fine powder can be satisfactorily dispersed in a sol and then sufficiently impregnated into the actinic radiation-irradiated portion.

When a sol solution of silicon alkoxide or a decomposition product of silicon alkoxide is employed, this silicon alkoxide or the decomposition product thereof is caused to adhere together with the fine powder onto an organosilane compound film as the organosilane compound film is immersed in the sol solution, so that when the organosilane compound film is subsequently heat-dried, a reaction takes place between the silicon alkoxide or the decomposition product and the silanolic hydroxyl group generated by the irradiation of an actinic radiation to the polysilane. Therefore, the silicon alkoxide or the decomposition product directly takes part as a crosslinking component in the formation of the three-dimensional structure of Si—O—Si bond, thus contributing to the improvement of durability of the resultant insulating film. In this case, a catalyst which is capable of promoting the aforementioned reaction between the silicon alkoxide or the decomposition product and the silanolic hydroxyl group generated by the irradiation of an actinic radiation may be added to the sol solution.

The sol solution of silicon alkoxide or the decomposition product thereof may not be admixed with a color component or fine powder, but may be impregnated into the organosilane compound film after these functional materials are impregnated in advance into the organosilane compound film. In this case, the sol solution should be impregnated into the organosilane compound film prior to the heat-drying step and after these functional materials are impregnated into the light-irradiated portion of the organosilane compound film. In this case also, the silicon alkoxide or the decomposition product is taken up as a crosslinking component in the silicon-based matrix having the three-dimensional structure of Si—O—Si bond, thus making it possible to obtain a color film or an insulating film having an excellent durability.

When an insulating film pattern is to be formed using these polysilane and fine powder, a solution containing a polysilane is prepared and then the solution is coated on the surface of a transparent substrate made of translucent glass or resin or on the surface of a semiconductor substrate, and then the coated layer is dried to evaporate a solvent at a temperature of 50 to 150° C. thereby obtaining an organosilane compound film comprising mainly of polysilane.

Examples of the organic solvent for polysilane useful in this case are toluene, xylene, methylethyl ketone, tetrahydrofuran, ethyl acetate cellosolve, butyrolactone and butyl lactate. These compounds may be used singly or in combination. A polysilane is dissolved in any of these solvents to prepare a 1 to 50 wt. % solution of polysilane, which is then filtrated through a filter of about 0.1 $\mu$m mesh if required, and then coated on the surface of a substrate by way of a spin coating.

The solution containing a polysilane that can be employed in this case may contain the aforementioned organometallic compound and a radical-generating agent or an acid-generating agent as a sensitizer. The mixing ratios of these components may be the same as explained in the above embodiments.

Then, an actinic radiation from a high pressure mercury lamp, xenon lamp or excimer laser is irradiated selectively onto a predetermined region of the organosilane compound film deposited on the substrate. When a film is irradiated in this manner with an actinic radiation, the irradiated portion of the polysilane represented by the general formula (4) absorbs the energy of the actinic radiation, resulting in the cut off of the Si—Si bond of polysilane. Subsequently, the oxygen or water in the air atmosphere is taken up by the cut portions of polysilane, resulting in the oxidation of the polysilane, which causes, together with the hydrogen atom directly attached in the form of a side chain to the silicon atom, the formation of silanolic hydroxyl groups.

When ultraviolet rays are employed as a light exposure source in the step of light exposure, the wavelength of ultraviolet rays may be about 150 to 400 nm. When ultraviolet rays of 200 to 300 nm in wavelength is employed for irradiating the organosilane compound film, an insulating film of high insulating property can be obtained. The irradiation dosage of ultraviolet rays should preferably be 10 mJ to 10 J, more preferably 100 mJ to 3 J. If the irradiation dosage of ultraviolet rays exceeds over 10 J, it will take a long period of time for the light exposure, thus deteriorating the productivity and at the same time giving rise to the generation of pin holes thus deteriorating the film quality. On the other hand, if the irradiation dosage of ultraviolet rays is less than 10 mJ, the impregnation of fine powder into the ultraviolet-irradiated portion of polysilane in the impregnation step may become insufficient due to the insufficient light exposure.

Then, the organosilane compound film is immersed in a solution containing fine powder of $SiO_2$ for example at a temperature of 0 to 50° C. for 0.5 to 10 minutes. As a result, the fine powder can be selectively adhered onto the ultraviolet-irradiated portion of the organosilane compound film where the silanolic hydroxyl group is formed. After the impregnation, the organosilane compound film is washed with water if required. Then, the organosilane compound film is heat-dried at a temperature of 50 to 150° C. for 5 to 30 minutes, thereby removing any solvent penetrated into the organosilane compound film, and at the same time allowing the silanolic hydroxyl groups generated in a large amount at the light exposure step to react with each other, resulting in the formation of a silicon-based matrix having a three-dimensional structure of Si—O—Si bond. Therefore, it is possible to obtain an insulating film containing fine powder such as $SiO_2$ in the silicon-based matrix and being excellent in durability and mechanical strength.

The entire surface of the organosilane compound film may be exposed to ultraviolet rays before subjecting it to a heat treatment and after the impregnation of fine powder such as $SiO_2$ in the light-exposed portion of the organosilane compound film. The wavelength of ultraviolet rays to be employed in this light exposure process may be about 150 to 400 nm, more preferable range of the wavelength of ultraviolet rays being 200 to 300 nm. The irradiation dosage of ultraviolet rays is 10 mJ to 10 J, more preferably 100 mJ to 3 J.

The organosilane compound film may be immersed in the aforementioned sol solution of a metal alkoxide before subjecting it to a heat treatment after the impregnation of fine powder in the light-exposed portion of the organosilane compound film. When the organosilane compound film is immersed in a sol solution in this manner, the silanolic hydroxyl groups generated in the step of the aforementioned entire exposure will be bonded to the metal of metal alkoxide adhering onto the organosilane compound film, thus making it possible, after the subsequent heat treatment thereof, to obtain an insulating film having a very high crosslinking density and being further improved in adhesion to a substrate and in heat resistance.

Subsequently, the portion of the organosilane compound film which does not contain the fine powder can be removed through dissolution by making use of an organic solvent or an aqueous alkaline solution. Namely, since the aforementioned silanolic hydroxyl group is not formed in the non-exposure portion of the organosilane compound film which does not contain the fine powder, the siloxane bond (Si—O—Si) of such a high crosslinking density that makes it insoluble in a solvent would not be formed in the non-exposure portion even if the organosilane compound film is heat-treated. Thus, the non-exposure portion of the organosilane compound film can be removed by making use of an aromatic solvent such as xylene; ketonic solvent such as methylethyl ketone; and an alcoholic solvent such as ethanol. On the other hand, if a portion of the organosilane compound film where the fine powder are not impregnated is to be removed by making use of an aqueous alkaline solution, the organosilane compound film is preliminarily irradiated by ultraviolet rays. This light exposure can be performed under the same conditions as described above, i.e., the wavelength of ultraviolet rays may be about 150 to 400 nm, more preferable range of the wavelength of ultraviolet rays being 200 to 300 nm, and the irradiation dosage of ultraviolet rays is 10 mJ to 10 J, more preferably 100 mJ to 3 J. Since the silanolic hydroxyl groups can be formed by this light exposure, the portion of the organosilane compound film not containing the fine powder can be easily removed through dissolution by the aforementioned aqueous alkaline solution. However, the polysilane to be employed in this case should be the one represented by the general formula (4) where $R^4$ is a substituted or non-substituted aryl group. It is also possible in this case to employ an aqueous solution of hydrofluoric acid.

With the method as explained above, an insulating film pattern of high electric resistance and high mechanical strength can be obtained.

If the patterning light exposure is changed to an entire exposure and at the same time the development process is omitted, an insulating film comprising an organosilane compound film impregnated all over the surface thereof with at least either one of $SiO_2$ fine powder and SiN fine powder can be obtained.

It is also possible to form an insulating film pattern by a method wherein the organosilane compound film formed on a substrate is patterned in advance, and then at least either one of $SiO_2$ fine powder and SiN fine powder is impregnated into the organosilane compound film pattern. However, it is required in this case to use a polysilane where $R^4$ in the general formula (4) is a substituted or non-substituted aryl group.

First of all, an actinic radiation is irradiated through a mask having predetermined pattern onto the organosilane compound film formed on a substrate. Then, the light exposure portion of the organosilane compound film is selectively removed by dissolving it with an aqueous alkaline solution or hydrofluoric acid to obtain a patterned organosilane compound film. This light exposure conditions and the developing solution may be the same as described above in reference to the formation of a positive type pattern.

Subsequently, ultraviolet rays are irradiated onto this patterned organosilane compound film under the same conditions as explained above to generate a silanolic hydroxyl group (Si—OH), followed by the step of immersing the patterned organosilane compound film in a solution containing fine powder such as $SiO_2$ to allow the fine powder to be adsorbed onto the patterned organosilane compound film.

Finally, the patterned organosilane compound film is heat-treated under the same conditions as described above to obtain a patterned insulating film.

The organosilane compound film may be immersed in the aforementioned sol solution of a metal alkoxide before subjecting it to a heat treatment thereby further improving the heat resistance of the insulating film.

It is possible according to the method as described above to produce an insulating film or an insulating film pattern formed of a vitrified silicon matrix having a three-dimensional Si—O—Si bond structure and containing at least either one of $SiO_2$ fine powder or SiN fine powder. The insulating film thus obtained is of high density due to the impregnation of the fine powder and has high electric resistance and high mechanical strength as in the case of the silicon polymer composition of the aforementioned third embodiment. When the insulating film is mixed with $SiO_2$ fine powder, the dielectric breakdown strength of the insulating film will be further improved. Further, when the insulating film is mixed with SiN fine powder, the ion-trapping property and $H_2O$ barrier property of the insulating film will be improved.

The method of forming an insulating film according to an eighth embodiment of this invention will be explained as follows.

According to the eighth embodiment, a polysilane having a repeating unit represented by the general formula (1) can be employed.

In the production of an insulating film, a solution containing such a polysilane dissolved in an organic solvent is coated on the surface of a predetermined substrate by way of a spin-coating method. As for the organic solvent useful in this case, various kinds of organic solvents as explained above such as toluene, xylene, etc. can be used.

This solution may contain a compound which is capable of generating an acid as the compound is heated (hereinafter referred to as a thermal acid-generating agent). Examples of such a thermal acid-generating agent are compounds represented by the chemical formula shown below. The mixing ratio of this thermal acid-generating agent should preferably be 0.05 to 5 wt. %. Because, if the mixing ratio of the thermal acid-generating agent is less than 0.05 wt. %, it would be difficult to lower the heating temperature in the step of thermally crosslinking the coated film containing polysilane and to sufficiently shorten the heating time, while if the mixing ratio of the thermal acid-generating agent exceeds over 5 wt. %, the formation of a coated film may become difficult and at the same time the electric properties of the insulating film to be obtained by heat-treating the coated film would be deteriorated.

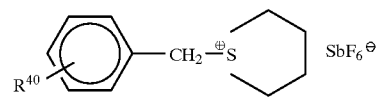

wherein $R^{40}$ represents a substituted or non-substituted alkyl or aryl group.

As for the substrate, a semiconductor substrate provided on the surface thereof with an interconnecting wiring, or a glass substrate provided on the surface thereof with an interconnecting wiring may be employed.

The film thus coated on the substrate is then heat-treated in an oxygen-containing atmosphere to turn it into a three-dimensional crosslinking structure via oxygen atom thereby forming an insulating film. There is not any particular restriction as to the kind of the oxygen-containing atmosphere as long as it is a gas atmosphere containing oxygen, preferably 1% or more of oxygen.

The aforementioned heat treatment should preferably be performed at a temperature of 100 to 600° C. If the temperature of the heat treatment is less than 100° C., a sufficient oxidation can not be realized, so that the film coated on the substrate can not be satisfactorily turned into a three-dimensional crosslinking structure via oxygen atom. On the other hand, if the temperature of the heat treatment exceeds over 600° C., the volume shrinkage of the film becomes too large to prevent the generation of cracks in the insulating film to be formed. Therefore, a preferable temperature range of the heat treatment is 200 to 500° C.

After a film is formed by coating a solution containing the aforementioned polysilane on a substrate and before this film is heat-treated in an oxygen-containing atmosphere, the film may be exposed to light in an oxygen-containing atmosphere. The wavelength of the light or ultraviolet rays to be employed in this light exposure process may be about 150 to 400 nm, more preferable range of the wavelength of ultraviolet rays being 200 to 300 nm. The irradiation dosage of ultraviolet rays is 10 mJ to 10 J, more preferably 100 mJ to 3 J.

The organosilane compound film may be immersed in the aforementioned sol solution of a metal alkoxide before subjecting it to a heat treatment thereby further improving the durability and the mechanical strength of the insulating film.

According to the eighth embodiment, the polysilane can be satisfactorily turned into a three-dimensional crosslinking structure via oxygen atom by heat-treating an organosilane compound film containing the polysilane having a repeating unit represented by the general formula (1). In this case, since a substituted or non-substituted aryl group is introduced into $R^1$ of the general formula (1), an insulating film having a suitable degree of flexibility would be obtained, so that the generation of cracks in the film would be effectively prevented.

Furthermore, the solution containing a polysilane represented by the general formula (1) is excellent in storage stability.

When a polysilane solution containing a thermal acid-generating agent is coated on a substrate and the resultant organosilane compound film is then heat-treated, the thermal acid-generating agent would be decomposed generating an acid. This acid then contributes to the transformation of hydrogen atom on the side chain of the polysilane to a hydroxyl group. Therefore, when a polysilane solution containing a thermal acid-generating agent is employed, the transformation of the silicon atom of the polysilane into a three-dimensional Si—O—Si bond structure can be accomplished at a relatively lower temperature and within a shorter period of time as compared with where a solution containing only the polysilane is employed.

When the organosilane compound film formed on the surface of a substrate is entirely exposed to light in an oxygen-containing atmosphere before the heat treatment, the polysilane in the film is caused to decompose, thus generating a silanolic hydroxyl group (Si—OH) having a high acidity. When this organosilane compound is heated after this light exposure in an oxygen-containing atmosphere, a siloxane bond (Si—O—Si) can be formed in high crosslinking density throughout the film. Therefore, it is possible to easily form an insulating film which is more excellent in adhesion to a substrate and in heat resistance than those where such a light exposure is not performed.

This invention will be further explained with reference to the following specific Examples and Comparative Examples.

EXAMPLE I

Example I-1

15 g of polysilane represented by the following chemical formula and having an average molecular weight of 4,000 was dissolved in 100 g of t-butyl lactate to prepare a resist solution, which was then spin-coated on a silicon substrate and prebaked at a temperature of 100° C. for 5 minutes, thereby forming a resist film 0.5 μm in thickness. Then, ultraviolet rays 254 nm in wavelength were irradiated from a low pressure mercury lamp at a dosage of 500 mJ/cm² onto the surface of the resist film through a mask pattern. Thereafter, the resist film was developed in a 2.38 wt. % aqueous solution of tetramethylammonium hydroxide at a temperature of 25° C. for 40 seconds thereby to obtain a positive pattern of excellent shape in high precision.

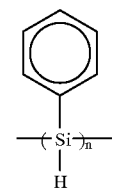

wherein n represents a polymerization degree.

Comparative Example I-1

15 g of polysilane represented by the following chemical formula and having an average molecular weight of 4,000 was dissolved in 100 g of t-butyl lactate to prepare a resist solution, which was then spin-coated on a silicon substrate and prebaked at a temperature of 100° C. for 5 minutes, thereby forming a resist film 0.8 μm in thickness. Then, ultraviolet rays 254 nm in wavelength were irradiated from a low pressure mercury lamp at a dosage of 500 mJ/cm² onto the surface of the resist film through a mask pattern. Thereafter, the resist film was developed in a 2.38 wt. % aqueous solution of tetramethylammonium hydroxide at a temperature of 25° C. However, the formation of pattern was not recognized.

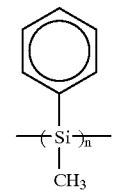

wherein n represents a polymerization degree.

Example I-2

100 g of polysilane having the same chemical structure as that of polysilane used in Example I-1 and an average molecular weight of 9,000, 4 g of benzoyl peroxide as a radical-generating agent functioning as a crosslinking agent for the polysilane, and 6 g of phenylene dialdehyde, i.e. an unsaturated compound were dissolved in 50 g of toluene to prepare a resist solution, which was then spin-coated on a silicon substrate and prebaked at a temperature of 100° C. for 5 minutes, thereby forming a resist film 0.5 μm in thickness. Then, ultraviolet rays 254 nm in wavelength were irradiated from a low pressure mercury lamp at a dosage of 500 mJ/cm² onto the surface of the resist film through a mask pattern. Thereafter, the resist film was developed in a 2.48 wt. % aqueous solution of tetramethylammonium hydroxide at a temperature of 25° C. for 40 seconds thereby to obtain a positive pattern of excellent shape in high precision.

This pattern was further subjected to a step baking for 30 minutes by gradually heated the pattern at a temperature of 100 to 200° C. As a result, the pattern after this heat treatment was confirmed to have a sufficient surface hardness of 3H in pencil hardness without accompanying any damage in shape of the pattern.

Example I-3

5 g of polysilane of the same kind as used in Example I-1 and 10 g of polyvinyl phenol having an average molecular weight of 12,000 (an alkali-soluble organic compound) were dissolved in 100 g of t-butyl lactate to prepare a resist solution, which was then spin-coated on a silicon substrate and prebaked at a temperature of 100° C. for 5 minutes, thereby forming a resist film 0.6 μm in thickness. Then, ultraviolet rays 254 nm in wavelength were irradiated from a low pressure mercury lamp at a dosage of 500 mJ/cm² onto the surface of the resist film through a mask pattern. Thereafter, the resist film was developed in a 1.19 wt. % aqueous solution of tetramethylammonium hydroxide at a temperature of 25° C. for 40 seconds thereby to obtain a positive pattern of excellent shape in high precision.

Comparative Example I-2

5 g of polysilane represented by the following chemical formula and having an average molecular weight of 5,000 and 10 g of polyvinyl phenol having an average molecular weight of 12,000 (an alkali-soluble organic compound) were dissolved in 100 g of t-butyl lactate to prepare a resist solution, which was then spin-coated on a silicon substrate and prebaked at a temperature of 100° C. for 5 minutes, thereby forming a resist film 0.6 μm in thickness. Then, ultraviolet rays 254 nm in wavelength were irradiated from a low pressure mercury lamp at a dosage of 500 mJ/cm² onto the surface of the resist film through a mask pattern. Thereafter, the resist film was developed in a 1.19 wt. % aqueous solution of tetramethylammonium hydroxide at a temperature of 25° C. for 40 seconds. However, the formation of pattern was not recognized at all.

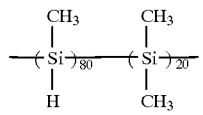

Example I-4

5 g of polysilane represented by the following chemical formula and having an average molecular weight of 7,000 and log of polyamic acid (an alkali-soluble organic compound; the intrinsic viscosity of 0.5 g/dl N-methyl-2-pyrrolidone solution thereof at 30° C.: 0.54 dl/g) were dissolved in 100 g of γ-butyrolactone to prepare a resist solution, which was then spin-coated on a silicon substrate and prebaked at a temperature of 100° C. for 5 minutes, thereby forming a resist film 1.2 μm in thickness. Then, ultraviolet rays 254 nm in wavelength were irradiated from a low pressure mercury lamp at a dosage of 500 mJ/cm² onto the surface of the resist film through a mask pattern. Thereafter, the resist film was developed in a 0.56 wt. % aqueous solution of tetramethylammonium hydroxide at a temperature of 25° C. for 10 seconds thereby to obtain a positive pattern of excellent shape in high precision.

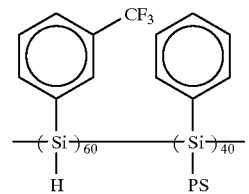

wherein PS represents a polysilane skeleton.

When this pattern was further subjected to a heat treatment at a temperature of 150° C. for one hour, at a temperature of 250° C. for one hour, and then at a temperature of 400° C. for another one hour, it was possible to obtain a film pattern mainly consisted of polyimide resin wherein the polyamic acid in the pattern was fully imidized.

Example I-5

2 g of polysilane represented by the following chemical formula and having an average molecular weight of 12,000 was dissolved in 10 g of toluene to prepare a 20 wt. % resist solution, which was then spin-coated on a silicon substrate and prebaked at a temperature of 100° C. for 5 minutes, thereby forming a resist film 0.7 μm in thickness. Then, ultraviolet rays 254 nm in wavelength were irradiated from a low pressure mercury lamp at a dosage of 1 J/cm² onto the surface of the resist film through a mask pattern. Thereafter, the resist film was developed in a 2.38 wt. % aqueous solution of tetramethylammonium hydroxide at a temperature of 25° C. for 90 seconds thereby to obtain a positive pattern having a line width of 1.0 μm. Furthermore, when the temperature of this pattern was gradually raised from room temperature to 400° C., an insulating film having a dielectric constant of 2.8% and a volume resistivity of 1×10¹³ Ω·cm was obtained.

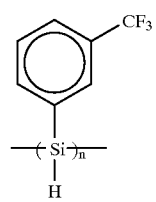

wherein n represents a polymerization degree.

When the film was further subjected to a heat treatment at a temperature of 150° C. for 10 minutes after the patterning light exposure in the above process and then subjected to a developing treatment in toluene for 90 seconds, it was possible as in the case of above experiment to obtain a reversed film pattern having a line width of 1.0 μm. Furthermore, when the temperature of this pattern was gradually raised from room temperature to 400° C., an insulating film having a dielectric constant of 2.8% and a volume resistivity of 1×10¹³ Ω·cm was obtained.

Example I-6

A resist solution was prepared in the same manner as in the case of Example I-6 except that a polysilane represented by the following chemical formula and having an average molecular weight of 12,000 was employed. This resist solution was then spin-coated on a silicon substrate, exposed to light and developed, thereby to obtain a pattern having a line width of 1.0 μm. Furthermore, when the temperature of this pattern was gradually raised from room temperature to 400° C., an insulating film having a dielectric constant of 3.2% and a volume resistivity of $1 \times 10^{13}$ Ω·cm was obtained.

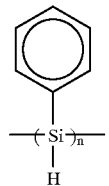

wherein n represents a polymerization degree.

It would be apparent from these results that a fine pattern which is capable of being developed by an alkaline development can be formed in high precision by making use of a resist comprising a silicon polymer composition of the first embodiment.

EXAMPLE II

Example II-1

100 parts by weight of polysilane (AA-1) represented by the following chemical formula and having an average molecular weight of 5,000 and 1 part by weight of trihalomethyl-s-triazine which is represented by the following chemical formula (BB-1) were dissolved in toluene to prepare a toluene solution of polymer composition.

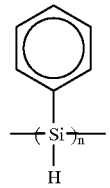

(AA-1)

wherein n represents a polymerization degree.

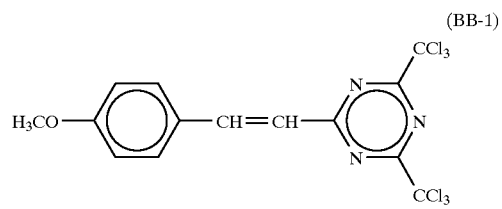

This toluene solution of polymer composition was then spin-coated on a substrate and dried, thereby forming an organosilane compound film 0.3 μm in thickness. Then, excimer laser beam was selectively irradiated through a mask pattern under the condition of 200 mJ/cm² onto the surface of the organosilane compound film. Thereafter, the organosilane compound film was prebaked at a temperature of 100° C. for 2 minutes and then developed in a 2.38 wt. % aqueous solution of tetramethylammonium hydroxide at a temperature of 25° C. for 90 seconds, followed by the steps of rinsing with pure water and heat drying to remove water, thereby to obtain a positive pattern.

Example II-2 to II-10

Nine kinds of positive patterns were formed using the silicon polymer compositions illustrated in the Table 1 shown below and following the same procedures as in the case of Example II-1 except that the conditions for the light exposure and development were varied as shown in the Table 1.

Then, the resolution and cross-sectional shape of each positive pattern were investigated, the results being shown in the Table 1 below.

TABLE 1

| Example | | 1 | 2 | 3 | 4 | 5 |
|---|---|---|---|---|---|---|
| Polysilane | AA-1 | 100 | 100 | 100 | | |
| | AA-2 | | | | 100 | 100 |
| | AA-3 | | | | | |
| | AA-4 | | | | | |
| Radical- or Acid- | BB-1 | 1 | 1 | | 1 | |
| generating agent | BB-2 | | | 1 | | 1 |
| | BB-3 | | | | | |
| | BB-4 | | | | | |
| | BB-5 | | | | | |
| | BB-6 | | | | | |
| | BB-7 | | | | | |
| Film thickness (μm) | | 0.5 | 0.5 | 0.5 | 0.5 | 0.5 |
| Post-baking temp/time | | 100° C./ 2 minutes | 100° C./ 2 minutes | 100° C./ 2 minutes | 100° C./ 2 minutes | 100° C./ 2 minutes |
| Exposure light | | KrF | KrF | KrF | KrF | KrF |
| Dosage | | 200 | 200 | 200 | 100 | 100 |
| Developing solution | | α | β | α | α | α |
| Developing time (sec.) | | 90 | 60 | 60 | 90 | 90 |
| Resolution (μm) | | 0.3 | 0.3 | 0.3 | 0.3 | 0.3 |
| Sectional shape of pattern | | Rectangular | Rectangular | Rectangular | Rectangular | Rectangular |

TABLE 1-continued

| Example | | 6 | 7 | 8 | 9 | 10 |
|---|---|---|---|---|---|---|
| Polysilane | AA-1 | | | | | |
| | AA-2 | | | | | |
| | AA-3 | 100 | 100 | 100 | | |
| | AA-4 | | | | 100 | 100 |
| Radical- or Acid-generating agent | BB-1 | | | | | |
| | BB-2 | | | | | |
| | BB-3 | | | | | |
| | BB-4 | | | | | |
| | BB-5 | 1 | 1 | | 1 | |
| | BB-6 | | | 1 | | |
| | BB-7 | | | | | 1 |
| Film thickness (μm) | | 0.5 | 0.5 | 0.5 | 0.5 | 0.5 |
| Post-baking temp/time | | 100° C./ 2 minutes | 100° C./ 2 minutes | 100° C./ 2 minutes | 100° C./ 2 minutes | 100° C./ 2 minutes |
| Exposure light | | KrF | KrF | KrF | KrF | KrF |
| Dosage | | 200 | 200 | 200 | 100 | 100 |
| Developing solution | | α | α | α | α | α |
| Developing time (sec.) | | 60 | 60 | 90 | 90 | 90 |
| Resolution (μm) | | 0.3 | 0.3 | 0.3 | 0.3 | 0.3 |
| Sectional shape of pattern | | Rectangular | Rectangular | Rectangular | Rectangular | Rectangular |

*1: The unit of the light exposure is mJ/cm$^2$.
*2: The developing solution α is a 2.38% aqueous solution of tetramethylammonium hydroxide, and the developing solution β is choline.

The polysilanes, radical-generating agents and acid-generating agents employed herein are shown below together with the codes thereof.

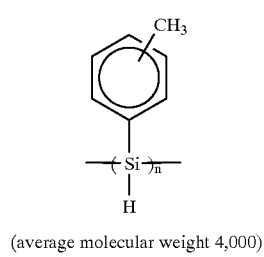

(AA-2)

(average molecular weight 4,000)

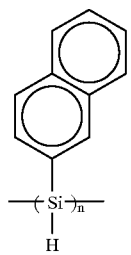

(AA-3)

(average molecular weight 3,000)

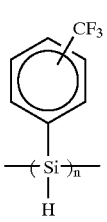

(AA-4)

(average molecular weight 6,000)

wherein n represents a polymerization degree.

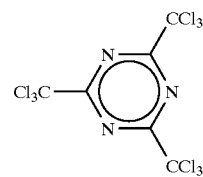

(BB-2)

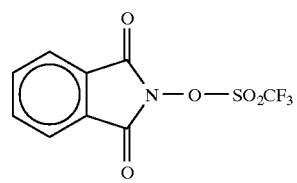

(BB-3)

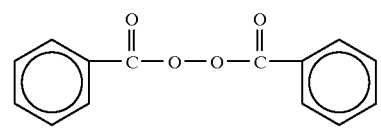

(BB-4)

(BB-5)

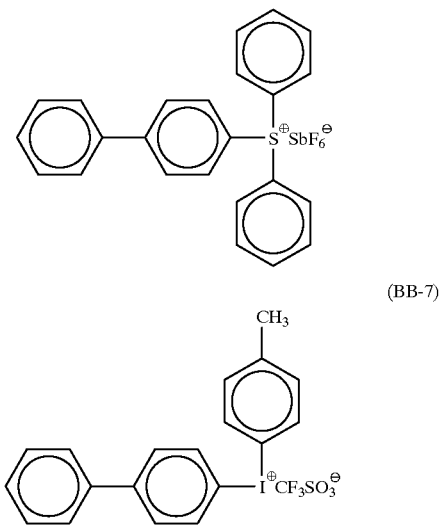

(BB-6)

(BB-7)

Comparative Example II-1

A positive pattern was prepared following the same procedures as in the case of Example II-1 except that a solution not containing trihalomethyl-s-triazine as a radical-generating agent was used and at the same time the dosage of light irradiation was altered to 300 mJ/cm².

The resolution of the positive pattern thus obtained in this Comparative Example was 0.7 μm and the cross-sectional shape of the pattern was trapezoidal.

As clearly seen from this Comparative Example and the results illustrated in the Table 1, the silicon polymer composition containing a radical-generating agent or an acid-generating agent (Example II-1 to II-10) is higher in sensitivity than the resist consisting only of polysilane. Moreover, the patterns formed from the silicon polymer composition containing a radical-generating agent or an acid-generating agent are also excellent in resolution and cross-sectional shape.

Example II-11

Figure 1B:
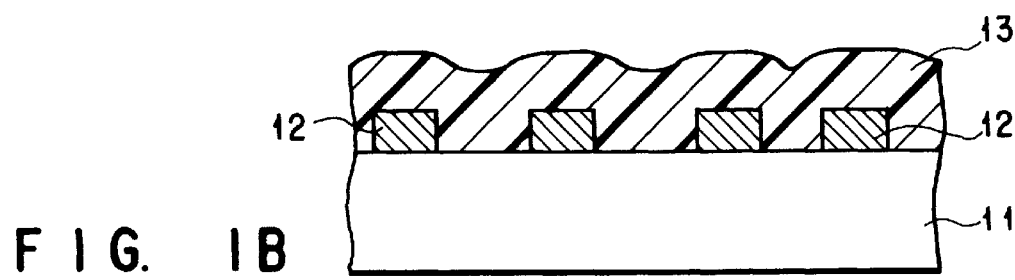
Figure 1C:
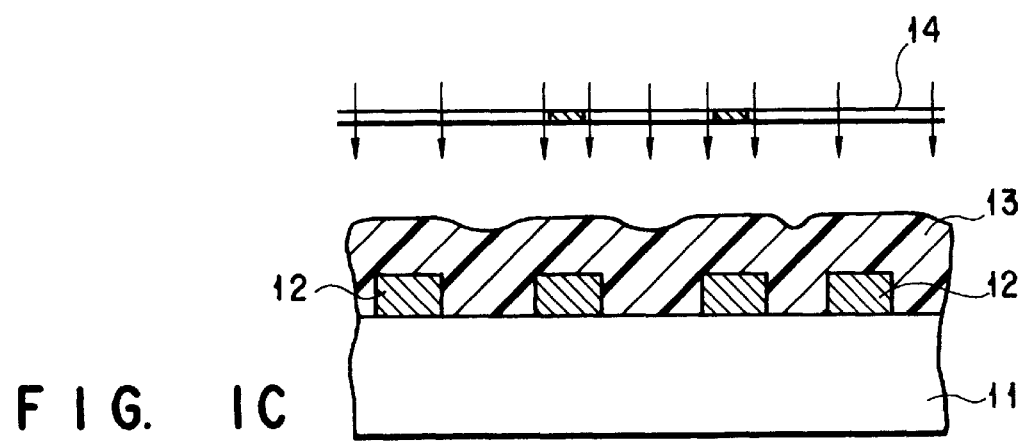

As shown in FIG. 1A, an aluminum wiring 12 having a width of 2 μm and a thickness of 1 μm was formed on a substrate 11 in such a manner that the space between the neighboring lines was set to 2 μm. Then, as shown in FIG. 1B, the same silicon polymer composition as used in Example II-1 was spin-coated on a substrate and dried, thereby forming an organosilane compound film 13 having a thickness of 2 μm. Then, as shown in FIG. 1C, ultraviolet rays from a low pressure mercury lamp were selectively irradiated through a mask pattern 14 onto the surface of the organosilane compound film 13 at a dosage of 500 mJ/cm². Then, after the heat treatment at a temperature of 130° C. for 10 minutes, the organosilane compound film 13 was subjected to a development treatment in xylene for 40 seconds to selectively dissolve and remove the non-exposed portion of the film 13, thereby forming a negative pattern.

Figure 1D:
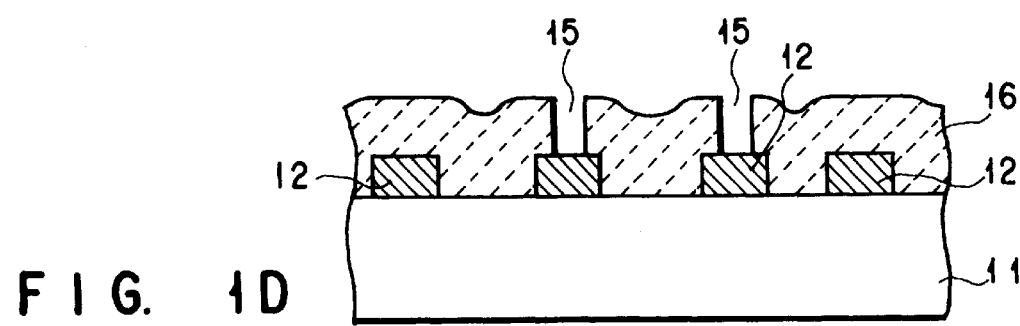

The resultant negative pattern was then heat-treated at a temperature of 400° C. for one hour thereby to form an insulating film pattern 16 constituted by a glass matrix and provided with a through-hole 15 having a size of 0.7 μm×1 μm and corresponding in location to wiring 12 as shown in FIG. 1D.

The insulating film pattern 16 thus obtained was free from any cracking and swelling, adhering excellently onto the substrate 11, and any reflow was not admitted around the opening of the through-hole 15. The volume resistivity of this insulating film pattern was found to be 5×10¹³ Ω·cm.

Example II-12

The same silicon polymer composition as used in Example II-1 was spin-coated on a transparent glass substrate and dried, thereby forming an organosilane compound film having a thickness of 2 μm. Then, ultraviolet rays from a low pressure mercury lamp were selectively irradiated through a mask pattern onto the surface of the organosilane compound film at a dosage of 600 mJ/cm². Then, the transparent glass substrate provided with the organosilane compound film was immersed into a 10 wt. % aqueous acetonitrile solution containing 1 wt. % of Victoria Blue BH (Hodogaya Kagaku Co.; triphenyl methane-based dye) as a color component for 5 minutes at a temperature of 25° C. Subsequently, the glass substrate was taken out, washed with water, and dried at a temperature of 100° C. for 30 minutes to obtain the organosilane compound film whose light-exposed portion was colored into blue.

Then, another mask was covered on the organosilane compound film in such a manner that the blue-colored portion was hidden by the mask, and ultraviolet rays from a low pressure mercury lamp were selectively irradiated through the mask pattern onto the surface of the organosilane compound film at a dosage of 600 mJ/cm². The resultant transparent substrate was immersed into a 10 wt. % aqueous acetonitrile solution containing 1 wt. % of Astraphloxine FF (Hodogaya Kagaku Co.; Methine-based dye) as a color component for 5 minutes at a temperature of 25° C. Subsequently, the transparent substrate was taken out, washed with water, and dried at a temperature of 100° C. for 30 minutes to obtain the organosilane compound film whose light-exposed portion was colored into red.

Further, another mask was covered on the organosilane compound film in such a manner that the blue-colored portion as well as red-colored portion were hidden by the mask, and ultraviolet rays from a low pressure mercury lamp were selectively irradiated through the mask pattern onto the surface of the organosilane compound film at a dosage of 600 mJ/cm². The resultant transparent substrate was immersed into a 10 wt. % aqueous acetonitrile solution containing 1 wt. % of Brilliant Basic cyanine 6GH (Hodogaya Kagaku Co.; Triphenyl methane-based dye) as a color component for 5 minutes at a temperature of 25° C. Subsequently, the transparent substrate was taken out, washed with water, and dried at a temperature of 100° C. for 30 minutes to obtain the organosilane compound film whose light-exposed portion was colored into green.

As a result, a flat film colored into red (R), blue (B) and green (G) could be formed on a predetermined region of the organosilane compound film.

It has been recognized from these results that the silicon polymer composition according to the second embodiment was a photo-sensitive composition which was high in sensitivity to light and excellent in resolution.

It is possible with the use of this silicon polymer composition to form a pattern of high precision having an excellent cross-sectional shape, and to apply it to the manufacture of an electronic element such as a semiconductor device and a liquid crystal display device.

Furthermore, it is possible with the use of this silicon polymer composition to form a color film of flat surface which is excellent in durability and mechanical strength, so that this silicon polymer composition can be effectively utilized for the manufacture of the color filter of a liquid crystal display device.

Example III

The polysilanes to be used in this example were synthesized as follows.

Synthesis of Polysilane AZr 60 ml of dried diethyl ether and 5.34 g of zirconocene dichloride were agitated in argon atmosphere at a temperature of −20° C. to form an admixture, and then 1.5M of methyl lithium was added little by little to the admixture, followed by the stirring of the admixture for a period of 70 minutes. After an additional stirring of the admixture for a period of 30 minutes at a temperature of 0° C., the diethyl ether was removed and a white solid precipitated was sublimed to obtain zirconocene dimethyl.

Then, this zirconocene dimethyl was added to phenyl silane at a molar ratio of 1:50 (zirconocene dimethyl/phenyl silane) to allow phenyl silane to be polymerized over a period of 5 hours at room temperature. Then, the resultant crude polymer was dissolved in toluene, and then poured into methanol with stirring thereby reprecipitating the polymer. The polymer was reprecipitated twice in the same manner as described above, and then dried under a reduced pressure at a temperature of 80 to 90° C. to obtain the polysilane AZr having a weight average molecular weight of about 6,000 and represented by the following chemical formula.

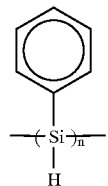

AZr wherein n represents a polymerization degree.

Synthesis of Polysilane BZr 10 g of the polysilane AZr and 15.5 g of azobis(isobutyronitrile) were dissolved in 50 g of acetone, and then refluxed for 3 days, thus allowing 50% of hydrogen atoms bonded to silicon atom to be substituted by isopropyl group, thereby obtaining the polysilane BZr having a weight average molecular weight of about 6,000 and represented by the following chemical formula.

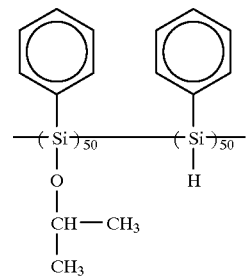

BZr

Synthesis of Polysilane CNa 10 g of methyldichlorosilane and 16.6 g of methylphenyl dichlorosilane were dissolved in toluene to prepare a 50 wt. % toluene solution. On the other hand, 8.4 g of metallic Na particles was dispersed in 100 ml of toluene in a 1 L flask, into which the aforementioned 50 wt. % toluene solution was added little by little at a temperature of 110° C. After the resultant admixture was stirred for a period of two hours, the temperature of the admixture was lowered down to room temperature and then filtered in argon atmosphere, the resultant filtrate being subsequently concentrated. This concentrated filtrate was dripped into isopropyl alcohol to precipitate a polymer.

Then, the resultant crude polymer thus obtained was dried under a reduced pressure, and dissolved again in toluene. After being washed with water, the toluene solution of the polymer was dripped into isopropyl alcohol in the same manner as described above to prepare the polymer. This procedure was repeated five times in the same manner as described above, and then dried under a reduced pressure to obtain the polysilane CNa having a weight average molecular weight of about 12,000 and represented by the following chemical formula.

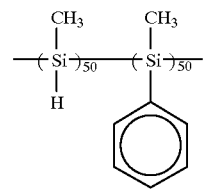

CNa

Synthesis of Polysilane ENa 10 g of methyldichlorosilane, 10 g of methylphenyl dichlorosilane and 7.4 g of phenyltrichlorosilane were dissolved in toluene to prepare a 50 wt. % toluene solution. Then, the same procedures were repeated as employed in the synthesis of the polysilane CNa, thereby obtaining the polysilane ENa having a weight average molecular weight of about 15,000 and represented by the following chemical formula.

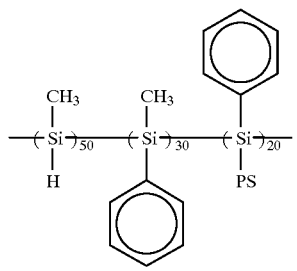

wherein PS represents a polysilane skeleton.

Preparation of Silicon Polymer Composition 15 g of polysilane AZr was dissolved in 85 g of toluene to obtain a toluene solution, to which 2.5 g of $SiO_2$ fine powder having an average particle diameter of 0.2 μm was dispersed by making use of a dispersant to obtain a silicon polymer composition (P-1).

On the other hand, 15 g of polysilane AZr was dissolved in 85 g of toluene to obtain a toluene solution, to which 5 g of SiN fine powder having an average particle diameter of 0.2 μm was dispersed by making use of a dispersant to obtain a silicon polymer composition (P-2).

Example III-1

The silicon polymer composition (P-1) was spin-coated on a silicon substrate and prebaked at a temperature of 100° C. for 5 minutes, thereby forming an organosilane compound film 2 μm in thickness. Then, ultraviolet rays 254 nm in wavelength were irradiated from a low pressure mercury lamp at a dosage of 1 J/cm² onto the surface of the organosilane compound film through a mask pattern. Thereafter, the organosilane compound film was developed in a 2.38 wt. % aqueous solution of tetramethylammonium hydroxide at a temperature of 25° C. for one minute thereby to obtain a positive pattern.

When the pattern thus obtained was heated for one hour at a temperature of 400° C., an insulating film of high density having a pencil hardness of 5H was obtained. When the insulating film thus obtained was evaluated regarding the adhesivity to the silicon substrate by means of the cross-cut adhesion test, a residual ratio of 100/100 on the substrate was recognized without admitting any stripping of the film. Further, the volume resistivity of the film was $1\times10^{14}$ Ω·cm, indicating an excellent resistivity, and softening of the film was not admitted even if the film was heated up to 300° C.

Example III-2

The silicon polymer composition (P-1) was spin-coated on a silicon substrate and prebaked at a temperature of 100° C. for 5 minutes, thereby forming an organosilane compound film 2 μm in thickness. Then, ultraviolet rays 254 nm in wavelength were irradiated from a low pressure mercury lamp at a dosage of 1 J/cm² onto the surface of the organosilane compound film through a mask pattern. Thereafter, the substrate was heated for 10 minutes at a temperature of 150° C., and then developed by making use of toluene thereby to obtain a negative pattern.

When the pattern thus obtained was heated for one hour at a temperature of 400° C., an insulating film of high density having a pencil hardness of 5H was obtained. When the insulating film thus obtained was evaluated regarding the adhesivity to the silicon substrate by means of the cross-cut adhesion test, a residual ratio of 100/100 on the substrate was recognized without admitting any stripping of the film. Further, the volume resistivity of the film was $1\times10^{14}$ Ω·cm, indicating an excellent resistivity, and softening of the film was not admitted even if the film was heated up to 300° C.

Example III-3

The silicon polymer composition (P-2) was spin-coated on a silicon substrate and prebaked at a temperature of 100° C. for 5 minutes, thereby forming an organosilane compound film 2 μm in thickness. Then, ultraviolet rays 254 nm in wavelength were irradiated from a low pressure mercury lamp at a dosage of 1 J/cm² onto the surface of the organosilane compound film through a mask pattern. Thereafter, the organosilane compound film was developed in a 2.38 wt. % aqueous solution of tetramethylammonium hydroxide for one minute thereby to obtain a positive pattern.

When the pattern thus obtained was heated for one hour at a temperature of 300° C. after the pattern was preliminarily irradiated with ultraviolet rays from a low pressure mercury lamp at a dosage of 1 J/cm², an insulating film of high density having a pencil hardness of 5H was obtained. When the insulating film thus obtained was evaluated regarding the adhesivity to the silicon substrate by means of the cross-cut adhesion test, a residual ratio of 100/100 on the substrate was recognized without admitting any stripping of the film. Further, the volume resistivity of the film was $1\times10^{14}$ Ω·cm, indicating an excellent resistivity, and softening of the film was not admitted even if the film was heated up to 300° C.

The Na ion-trapping property and $H_2O$ barrier property of the insulating film were investigated as follows.

First of all, a $SiO_2$ film was formed on the surface of a silicon substrate by means of the CVD method, and then an insulating film was deposited on this $SiO_2$ film in the same manner as explained above except that any positive pattern was not formed in this case, thereby obtaining a sample.

After immersing this sample in a 1 wt. % aqueous NaOH solution for one hour, the detection of Na ion in the substrate and insulating film was performed by making use of SIMS. As a result, the Na ion was found to have been adsorbed near the surface of the insulating film and the presence of the Na ion was not admitted on the $SiO_2$ film.

As for the $H_2O$ barrier property of the insulating film, the same sample as mentioned above was left for one day in a Petri dish filled with $D_2O$. In this case, the sample was placed in the Petri dish in such a manner that the coated surface of substrate was exposed to the $D_2O$ atmosphere. Subsequently, the detection of $D_2O$ in the substrate and insulating film was performed by making use of SIMS. As a result, the presence of the $D_2O$ was not admitted in the substrate and the $SiO_2$ film.

Example III-4

The silicon polymer composition (P-2) was spin-coated on a silicon substrate and prebaked at a temperature of 100° C. for 5 minutes, thereby forming an organosilane compound film 2 μm in thickness. Then, ultraviolet rays 254 nm in wavelength were irradiated from a low pressure mercury lamp at a dosage of 1 J/cm² onto the surface of the organosilane compound film through a mask pattern. Thereafter, the substrate was heated for 10 minutes at a temperature of 150° C., and then developed by making use of toluene thereby to obtain a negative pattern.

When the pattern thus obtained was heated for one hour at a temperature of 400° C., an insulating film of high density having a pencil hardness of 5H was obtained. When the insulating film thus obtained was evaluated regarding the adhesivity to the silicon substrate by means of the cross-cut adhesion test, a residual ratio of 100/100 on the substrate was recognized without admitting any stripping of the film. Further, the volume resistivity of the film was $1\times10^{14}$ Ω·cm, indicating an excellent resistivity, and softening of the film was not admitted even if the film was heated up to 300° C.

Then, the Na ion-trapping property and $H_2O$ barrier property of the organosilane compound film were investigated in the same manner as in Example III-3, finding that the organosilane compound film was excellent in Na ion-trapping property and $H_2O$ barrier property.

Comparative Example III-1

An organosilane compound film was formed in the same manner as in the case of Example III-1 except that a silicon polymer composition comprising polymethylphenyl silane having an average molecular weight of 8,000 in place of the polysilane AZr was employed. Then, this organosilane compound film was heated up to 400° C. However, it was impossible to obtain a film of high density, i.e., the film could be damaged and stripped away by the pencil hardness of B.

In the Examples (III-1) to (III-4), the silicon polymer composition of the third embodiment was employed for the manufacture of the insulating film or the insulating film pattern containing at least either one of $SiO_2$ fine powder or SiN fine powder. However, these insulating film or the insulating film pattern may also be produced by the following methods.

Example III-5

A 15 wt. % toluene solution of the polysilane AZr was spin-coated on a silicon wafer and prebaked at a temperature of 100° C. for 5 minutes, thereby forming an organosilane compound film 2 μm in thickness. Then, ultraviolet rays were irradiated from a low pressure mercury lamp at a dosage of 1 $J/cm^2$ onto the surface of the organosilane compound film. Thereafter, the wafer thus treated was immersed in an isopropyl alcohol solution having $SiO_2$ fine powder (average particle diameter: 0.1 μm) dispersed therein at a concentration of 10 wt. %, washed with water, and then heat-dried for 30 minutes at a temperature of 150° C. and for additional one hour at a temperature of 400° C., thereby obtaining an insulating film comprising a silicon-based matrix impregnated with $SiO_2$ fine powder.

The film thus obtained was of high density having a pencil hardness of 5H. When the insulating film thus obtained was evaluated regarding the adhesivity to the silicon substrate by means of the cross-cut adhesion test, a residual ratio of 100/100 on the substrate was recognized without admitting any stripping of the film. Further, the volume resistivity of the film was $1\times10^{14}$ Ω·cm, indicating an excellent resistivity, and softening of the film was not admitted even if the film was heated up to 300° C.

Example III-6

A 15 wt. % toluene solution of the polysilane BZr was spin-coated on a silicon wafer and prebaked at a temperature of 100° C. for 5 minutes, thereby forming an organosilane compound film 2 μm in thickness. Then, ultraviolet rays were irradiated from a low pressure mercury lamp at a dosage of 1 $J/cm^2$ onto the surface of the organosilane compound film. Thereafter, the wafer thus treated was immersed in an isopropyl alcohol solution having SiN fine powder (average particle diameter: 0.1 μm) dispersed therein at a concentration of 10 wt. %, washed with water, and then heat-dried for 30 minutes at a temperature of 150° C. and for additional one hour at a temperature of 400° C., thereby obtaining an insulating film comprising a silicon-based matrix impregnated with SiN fine powder.

The film thus obtained was of high density having a pencil hardness of 5H. When the insulating film thus obtained was evaluated regarding the adhesivity to the silicon substrate by means of the cross-cut adhesion test, a residual ratio of 100/100 on the substrate was recognized without admitting any stripping of the film. Further, the volume resistivity of the film was $1\times10^{14}$ Ω·cm, indicating an excellent resistivity, and softening of the film was not admitted even if the film was heated up to 300° C.

Then, the Na ion-trapping property and $H_2O$ barrier property of the organosilane compound film were investigated in the same manner as in Example III-3, finding that the organosilane compound film was excellent in Na ion-trapping property and $H_2O$ barrier property.

Example III-7

A 15 wt. % toluene solution of the polysilane ENa was spin-coated on a silicon wafer and prebaked at a temperature of 100° C. for 10 minutes, thereby forming an organosilane compound film 2 μm in thickness. Then, ultraviolet rays were irradiated from a low pressure mercury lamp at a dosage of 1 $J/cm^2$ onto the surface of the organosilane compound film. Thereafter, the wafer thus treated was immersed in an isopropyl alcohol solution having SiN fine powder (average particle diameter: 0.1 μm) dispersed therein at a concentration of 10 wt. %, washed with water, and then heat-dried for 30 minutes at a temperature of 150° C. and for additional one hour at a temperature of 400° C., thereby obtaining an insulating film comprising a silicon-based matrix impregnated with SiN fine powder.

The film thus obtained was of high density having a pencil hardness of 5H. When the insulating film thus obtained was evaluated regarding the adhesivity to the silicon substrate by means of the cross-cut adhesion test, a residual ratio of 100/100 on the substrate was recognized without admitting any stripping of the film. Further, the volume resistivity of the film was $1\times10^{14}$ Ω·cm, indicating an excellent resistivity, and softening of the film was not admitted even if the film was heated up to 300° C.

Then, the Na ion-trapping property and $H_2O$ barrier property of the organosilane compound film were investigated in the same manner as in Example III-3, finding that the organosilane compound film was excellent in Na ion-trapping property and $H_2O$ barrier property.

Example III-8

A 15 wt. % toluene solution of the polysilane CNa was spin-coated on a silicon wafer and prebaked at a temperature of 100° C. for 5 minutes, thereby forming an organosilane compound film 2 μm in thickness. Then, ultraviolet rays were irradiated from a low pressure mercury lamp at a dosage of 1 $J/cm^2$ onto the surface of the organosilane compound film. Thereafter, the wafer thus treated was immersed in an isopropyl alcohol solution having SiN fine powder (average particle diameter: 0.1 μm) dispersed therein at a concentration of 10 wt. %, washed with water, and then heat-dried for 30 minutes at a temperature of 150°

C., thereby obtaining an insulating film comprising a silicon-based matrix and selectively impregnated in its light-exposed portion with SiN fine powder.

(Example III-9

A 15 wt. % toluene solution of the polysilane BZr was spin-coated on a silicon wafer and prebaked at a temperature of 100° C. for 5 minutes, thereby forming an organosilane compound film 2 μm in thickness. Then, ultraviolet rays were irradiated from a low pressure mercury lamp at a dosage of 1 J/cm$^2$ onto the surface of the organosilane compound film. Thereafter, the wafer thus treated was immersed in an isopropyl alcohol solution having SiN fine powder (average particle diameter: 0.1 μm) dispersed therein at a concentration of 10 wt. %, washed with water, and then heat-dried for 30 minutes at a temperature of 150° C., thereby obtaining an insulating film comprising a silicon-based matrix and selectively impregnated in its light-exposed portion with SiN fine powder.

When this insulating film was subjected to a development by making use of a 2.38 wt. % aqueous solution of tetramethylammonium hydroxide for one minute after this insulating film was entirely exposed to the irradiation from a low pressure mercury lamp, the portion where the SiN fine powder were not impregnated was dissolved and removed, thereby obtaining a patterned insulating film. When this patterned insulating film was heated at a temperature of 400° C. for one hour, an insulating film of high density could be formed.

Comparative Example III-2

An insulating film impregnated with SiO$_2$ fine powder was formed in the same manner as in the case of Example III-5 except that a silicon polymer composition comprising polymethylphenyl silane having an average molecular weight of 8,000 in place of the polysilane AZr was employed. However, it was impossible to obtain a film of high density, i.e., the film could be damaged and stripped away by the pencil hardness of B, indicating an insufficient adhesivity to the substrate.

It has been confirmed from these results that, by making use of a silicon polymer composition of the third embodiment, fine powder such as SiO$_2$ fine powers can be introduced into the silicon-based matrix having a Si—O—Si bond three-dimensional structure, so that the adhesivity of the film can be improved and at the same time an insulating film of high electric resistance and mechanical strength can be obtained.

Example IV

Example IV-1

Figure 2A:
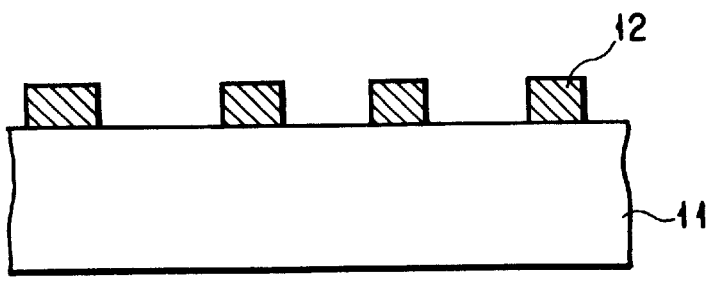
FIGS. 2A to 2D are sectional views schematically showing another example of the process for forming a pattern according to this invention.
Figure 2B:
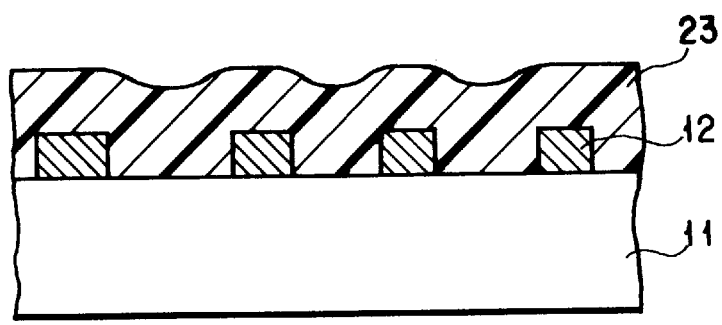

As shown in FIG. 2A, an aluminum wiring 12 having a width of 2 μm and a thickness of 1 μm was formed on a substrate 11 in such a manner that the space between the neighboring lines was set to 2 μm. Then, as shown in FIG. 2B, a 15 wt. % toluene solution of the polysilane AZr was then spin-coated on a substrate and dried, thereby forming an organosilane compound film 23 having a thickness of 2 μm.

Figure 2C:
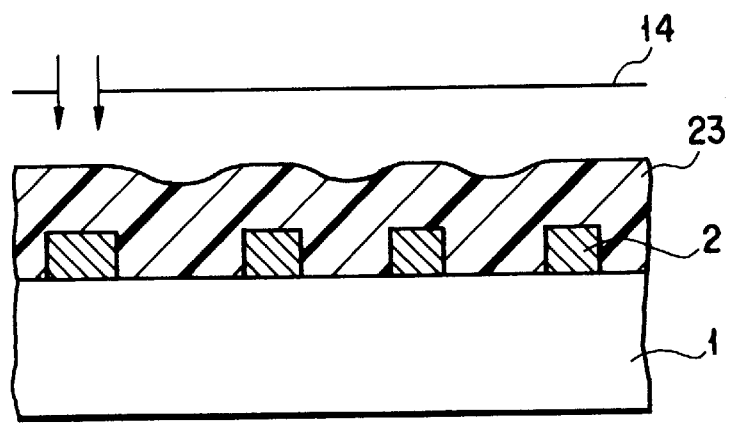

Then, as shown in FIG. 2C, ultraviolet rays from a low pressure mercury lamp were selectively irradiated through a mask pattern 14 onto the surface of the organosilane compound film 23 at a dosage of 500 mJ/cm$^2$. Then, a development treatment was performed for 40 seconds by making use of a 2.38 wt. % aqueous solution of tetramethylammonium hydroxide, thereby selectively dissolving and removing the light-exposed portion of the film 23 to form a positive pattern. This positive pattern was then rinsed with pure water, heat-dried to remove water, and then the entire surface of the pattern was irradiated with ultraviolet rays from a low pressure mercury lamp at a dosage of 1 J/cm$^2$.

Figure 2D:
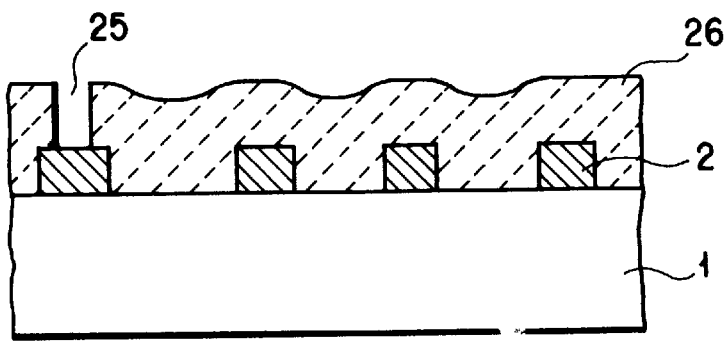

The resultant negative pattern was then heat-treated at a temperature of 450° C. for one hour thereby to form an insulating film pattern 26 constituted by a glass matrix and provided with a through-hole 25 having a size of 0.7 μm×1 μm and corresponding in location to wiring 12 as shown in FIG. 2D.

The insulating film pattern 26 thus obtained was free from any cracking and swelling, adhering excellently onto the substrate 11, and any reflow was not admitted around the opening of the through-hole 25. The volume resistivity of this insulating film pattern was found to be 5×10$^{13}$ Ω·cm.

Example IV-2

The entire surface of the organosilane compound film was exposed to light following the same procedures as in the aforementioned Example IV-1, and then the organosilane compound film was immersed in a sol solution of aluminum alkoxide. Then, the organosilane compound film was heat-treated for one hour at a temperature of 450° C. As a result, an insulating film pattern adhering more strongly onto the substrate as compared with the pattern of Example IV-1 could be formed.

Example IV-3

As shown in FIG. 1A, an aluminum wiring 12 having a width of 2 μm and a thickness of 1 μm was formed on a substrate 11 in such a manner that the space between the neighboring lines was set to 2 m. Then, as shown in FIG. 1B, a 15 wt. % toluene solution of the polysilane AZr was spin-coated on a substrate and dried, thereby forming an organosilane compound film 13 having a thickness of 2 μm. Then, as shown in FIG. 1C, ultraviolet rays from a low pressure mercury lamp were selectively irradiated through a mask pattern 14 onto the surface of the organosilane compound film 13 at a dosage of 500 mJ/cm$^2$. Then, after the heat treatment at a temperature of 130° C. for 10 minutes, the organosilane compound film 13 was subjected to a development treatment in xylene for 40 seconds to selectively dissolve and remove the non-exposed portion of the film 13, thereby forming a negative pattern.

The resultant negative pattern was then heat-treated at a temperature of 450° C. for one hour thereby to form an insulating film pattern 16 constituted by a glass matrix and provided with a through-hole 15 having a size of 0.7 m×1 μm and corresponding in location to wiring 12 as shown in FIG. 1D.

The insulating film pattern 16 thus obtained was free from any cracking and swelling, adhering excellently onto the substrate 11, and any reflow was not admitted around the opening of the through-hole 15. The volume resistivity of this insulating film pattern was found to be 5×10$^{13}$ Ω·cm.

Comparative Example IV-1

In the same manner as illustrated in Example IV-1, an aluminum wiring having a width of 2 μm and a thickness of 1 μm was formed on a substrate in such a manner that the space between the neighboring lines was set to 2 μm. Then, a 15 wt. % toluene solution of the polysilane AZr was spin-coated on a substrate and dried, thereby forming an organosilane compound film having a thickness of 2 μm. Then, ultraviolet rays from a low pressure mercury lamp were selectively irradiated through a mask pattern onto the surface of the organosilane compound film at a dosage of 500 mJ/cm². Then, without performing the heat treatment at a temperature of 130° C. for 10 minutes, the organosilane compound film was directly subjected to a development treatment in isopropyl alcohol for 40 seconds. As a result, the organosilane compound film was entirely dissolved, failing to form a pattern.

Example IV-4

5 parts by weight of acetylacetonato zirconium was added as an organometallic compound to 100 parts by weight of a 15 wt. % toluene solution of the polysilane AZr to prepare a solution to be used in this Example.

This solution thus obtained was spin-coated on the surface of a substrate provided with an aluminum wiring, thereby forming an organosilane compound film having a thickness of 2 μm. Then, ultraviolet rays from a low pressure mercury lamp were selectively irradiated through a mask pattern onto the surface of the organosilane compound film at a dosage of 250 mJ/cm². Then, after the heat treatment at a temperature of 150° C. for 10 minutes, the organosilane compound film was subjected to a development treatment in xylene for 40 seconds to form a negative pattern provided with a through-hole having a size of 0.7 μm×1 μm and corresponding in location to the wiring.

The resultant negative pattern was then heat-treated at a temperature of 450° C. for one hour thereby to form an insulating film pattern constituted by a glass matrix.

The insulating film pattern thus obtained was free from any cracking and swelling, adhering excellently onto the substrate, and the through-hole thus obtained was sharp in cross-sectional shape and also free from any reflow around the opening thereof. The volume resistivity of this insulating film pattern was found to be $2\times10^{13}$ μΩcm.

Example IV-5

The same procedures as performed in Example IV-4 were repeated except that the dosage of ultraviolet irradiation in the patterning light exposure step was altered to 400 mJ/cm², thereby forming an insulating film pattern.

The insulating film pattern thus obtained was free from any cracking and swelling, adhering excellently onto the substrate, and the through-hole thus obtained was sharp in cross-sectional shape and also free from any reflow around the opening thereof. The volume resistivity of this insulating film pattern was found to be $2\times10^{13}$ Ω·cm.

Example IV-6

The same procedures as performed in Example IV-4 were repeated except that the mixing ratio of the acetylacetonato zirconium as an organometallic compound was altered to 25 parts by weight per 100 parts by weight of the toluene solution of the polysilane AZr, thus preparing a solution to be used in this Example.

The insulating film pattern thus obtained was free from any cracking and swelling, adhering excellently onto the substrate, and the through-hole thus obtained was sharp in cross-sectional shape and also free from any reflow around the opening thereof. The volume resistivity of this insulating film pattern was found to be $2\times10^{13}$ Ω·cm.

Example IV-7

The same procedures as performed in Example IV-4 were repeated except that the same amount of triacetylacetonato aluminum as employed in Example IV-4 was employed as an organometallic compound to be added to the toluene solution of the polysilane AZr, thus preparing a solution to be used in this Example.

The insulating film pattern thus obtained was free from any cracking and swelling, adhering excellently onto the substrate, and the through-hole thus obtained was sharp in cross-sectional shape and also free from any reflow around the opening thereof. The volume resistivity of this insulating film pattern was found to be $2\times10^{13}$ Ω·cm.

It has been confirmed from these results that, by making use of the method of forming a pattern according to the present invention, an insulating film pattern having a flat surface and being excellent in adhesivity to a substrate as well as in heat resistance can be obtained.

Example V

Example V-1

Polyphenyl silane having a molecular weight of 5,400 was dissolved in xylene to obtain a 20 wt. % xylene solution of polysilane. The xylene solution thus obtained was spin-coated on the surface of a silicon wafer and heat-treated at a temperature of 100° C. for 5 minutes, thereby forming an organosilane compound film having a thickness of 2 μm. Then, the organosilane compound film was heat-dried by gradually heated it up from 100° C. to 350° C. in the air atmosphere to obtain an insulating film which was formed of a three-dimensional structure crosslinked via oxygen atom and free from any cracking.

Since the insulating film thus obtained indicated the absorption of IR spectrum based on the stretching vibration of Si—O—Si at 1,000 to 1,100 cm$^{-1}$, it was confirmed that the insulating film was formed of a three-dimensional structure constituted by the Si—O—Si bond. The volume resistivity of this insulating film pattern was found to be in the order of $10^{13}$ μ·cm.

When the above solution to be employed in this Example was stored at room temperature for one month, the gelling of the solution was not admitted at all.

Example V-2

The same procedures as performed in Example V-1 were repeated except that prior to the heat treatment in the air atmosphere of the organosilane compound film formed on the wafer, the surface of the organosilane compound film was entirely exposed to the irradiation of 500 W from a deep UV lamp for one minute in the air atmosphere, thus obtaining an insulating film.

The volume resistivity of this insulating film was found to be in the order of $10^{13}$ Ω·cm.

Example V-3

2 g of polyphenyl silane having a molecular weight of 5,400 and 0.5 g of a compound represented by the following chemical formula and functioning as a thermal oxygen-generating agent were dissolved in log of xylene to obtain a xylene solution of polysilane.

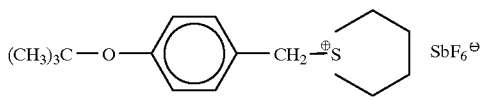

Then, the xylene solution obtained in this manner was spin-coated on the surface of a silicon wafer and heat-treated for 5 minutes at a temperature of 100° C., thereby forming an organosilane compound film having a thickness of 2 μm. Then, the organosilane compound film was entirely exposed to the irradiation of 500 W from a deep UV lamp for one minute in the air atmosphere. After this light exposure, the organosilane compound film was heat-dried by gradually heated it up from 100° C. to 350° C. in the air atmosphere to obtain an insulating film which was formed of a three-dimensional structure of polyphenyl silane crosslinked via oxygen atom and free from any cracking.

Comparative Example V-1

First of all, polymethyl silane having a molecular weight of 7,400 was dissolved in xylene to obtain a 20 wt. % xylene solution of polysilane.

Then, this xylene solution was spin-coated on the surface of a silicon wafer and heat-treated for 5 minutes at a temperature of 100° C., thereby forming an organosilane compound film having a thickness of 1.7 μm. Then, the organosilane compound film was gradually heated up from 100° C. to 350° C. in the air atmosphere to obtain an insulating film. As a result, cracks were found on the surface of this insulating film.

When the above solution to be employed in this Comparative Example was stored at room temperature for one month, the gelling of the solution was admitted.

It has been confirmed from these results that, by making use of the method of forming an insulating film according to the present invention, an insulating film of high quality which is excellent in flatness and free from the generation of cracks resulting from the volume shrinkage thereof can be obtained.

As explained above, it is possible, by making use of the silicon polymer composition and the method of forming a pattern according to this invention, to form a fine pattern in high precision and in high sensitivity by way of an alkaline development. Moreover, the pattern thus obtained may be vitrified to turn it into an insulating pattern which is excellent in mechanical strength and in heat resistance. Furthermore, it is possible, according to this invention, to provide a method of forming an insulating film which is excellent in adhesion to a substrate and heat resistance, and is high in electric resistance and mechanical strength, and also to provide a silicon polymer composition which is capable of easily producing such an insulating film.

Further, it is also possible, according to this invention, to provide a color film having a flat surface, which is excellent in durability and mechanical strength.

The insulating film to be produced by this invention is useful as a passivation film of a semiconductor device or as an interlayer insulating film. On the other hand, the color film to be produced by this invention is useful as a color filter for a liquid crystal display device. Accordingly, this invention would be very useful for the manufacture of a semiconductor device and a liquid crystal display device, and therefore very valuable in industrial view point.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A silicon polymer composition comprising a polysilane having a repeating unit represented by the following general formula (4) and at least one kind of powders selected from $SiO_2$ fine powder and SiN powder

wherein $R^4$ is a substituted or non-substituted aryl group, or a substituted or non-substituted alkyl group.

2. A silicon polymer composition comprising a polysilane having a repeating unit represented by the following general formula (1) and not having a polymerizable multi-bond, and a compound which is capable of generating a radial or an acid as it is irradiated by an actinic radiation

wherein Ar is a substituted or non-substituted aryl group, wherein said compound which is capable of generating a radical or an acid is an organic halogen compound represented by the general formula (2) shown below:

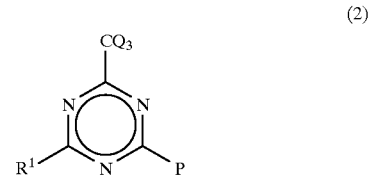

wherein Q is bromine atom or chlorine atom; P is $CQ_3$, -NH2, -NHR$^2$, -N(R$^2$)$_2$, -OR$^2$ or a substituted or non-substituted phenyl group, wherein Q is as above defined; $R^2$ is a phenyl group, naphthyl group or lower alkyl group having not more than 6 carbon atoms; and $R^1$ is -CQ$_3$, -NH$_2$, -NHR$^2$, -N(R$^2$)$_2$, -OR$^2$, -(CH=CH)$_n$ -W or a substituted or non-substituted phenyl group, wherein Q and $R^2$ are as above defined, n is an integer of 1 to 3, W is an aromatic group, heterocyclic group or a group represented by the following general formula (3)

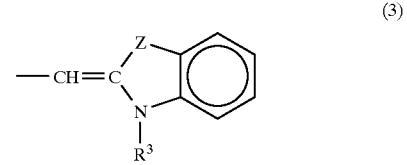

wherein Z is an oxygen atom or a sulfur atom; and $R^3$ is a lower alkyl group or phenyl group.

3. A silicon polymer composition comprising a polysilane having a repeating unit represented by the following general formula (1) and not having a polymerizable multi-bond, and a compound which is capable of generating a radial or an acid as it is irradiated by an actinic radiation

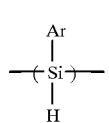
(1)

wherein Ar is a substituted or non-substituted aryl group wherein said compound which is capable of generating a radical or an acid is mixed in said composition at a ratio of 0.01 to 3 wt. % based on said polysilane and is an organic halogen compound represented by the general formula (2) shown below:

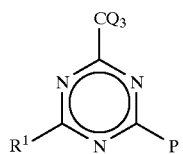
(2)

wherein Q is bromine atom or chlorine atom: P is $CQ_3$, $-NH_2$, $-NHR^2$, $-N(R^2)$, $-OR^2$ or a substituted or non-substituted phenyl group, wherein Q is as above defined, $R^2$ is a phenyl group, naphthyl group or lower alkyl group having not more than 6 carbon atoms: and $R^1$ is $-CO_3$, $-NH_2$, $-NHR^2$, $-N(R^2)_2$, $-(CH=CH)_n$ $-W$ or a substituted or non-substituted phenyl group, wherein Q and $R^2$ are as above defined, n is an integer of 1 to 3, W is an aromatic group, heterocyclic group or a group represented by the following general formula (3)

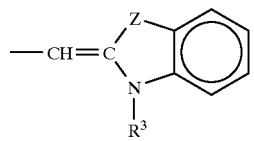
(3)

wherein Z is an oxygen atom or a sulfur atom; and $R^3$ is a lower alkyl group or phenyl group.

4. A method of forming a pattern comprising the steps of:

forming a film of an organosilane compound comprising a polysilane having a repeating unit represented by the following general formula (1) on a substrate;

irradiating an actinic radiation onto a predetermined portion of the film of the organosilane compound formed on the substrate; and removing said predetermined portion of the film irradiated by the actinic radiation by dissolving it with an aqueous alkaline developing solution

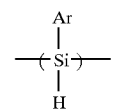
(1)

wherein Ar is a substituted or non-substituted aryl group.

5. The method of forming a pattern according to claim 4, wherein said organosilane compound film further contains a compound which is capable of generating a radical or an acid as it is irradiated by an actinic radiation.

6. The method of forming a pattern according to claim 5, wherein said compound which is capable of generating a radical or an acid is an organic halogen compound represented by the general formula (2) shown below:

(2)

wherein Q is bromine atom or chlorine atom; P is $-CQ_3$, $-NH_2$, $-NHR^2$, $-N(R^2)_2$, $-OR^2$ or a substituted or non-substituted phenyl group, wherein Q is as above defined, $R^2$ is phenyl group, naphthyl group or lower alkyl group having not more than 6 carbon atoms; and $R^1$ is $-CQ_3$, $-NH_2$, $-NHR^2$, $-N(R^2)_2$, $-OR^2$, $-(CH=CH)_n-W$ or a substituted or non-substituted phenyl group, wherein Q and $R^2$ are as above defined, n is an integer of 1 to 3, W is an aromatic group, heterocyclic group or a group represented by the following general formula (3)

(3)

wherein Z is oxygen atom or sulfur atom; and $R^3$ is lower alkyl group or phenyl group.

7. The method of forming a pattern according to claim 6, wherein said compound which is capable of generating a radical or an acid is mixed in said composition at a ratio of 0.01 to 3 wt. % based on said polysilane.

8. The method of forming a pattern according to claim 4, wherein said organosilane compound film further contains at least one kind of powders selected from $SiO_2$ powder and SiN powder.

9. The method of forming a pattern according to claim 4, which further comprises a step of heat-drying the organosilane compound film after the developing step thereby to turn the film into a three-dimensional structure.

10. The method of forming a pattern according to claim 9, which further comprises a step of irradiating the entire surface of said organosilane compound film prior to the heat-drying step of the organosilane compound film.

11. A method of forming a pattern comprising the steps of:
forming a film of an organosilane compound comprising a polysilane having a repeating unit represented by the following general formula (1) on a substrate;

irradiating an actinic radiation onto a predetermined portion of the film of the organosilane compound formed on the substrate;

heating the film of the organosilane compound after the irradiation of the actinic radiation; and removing a non-irradiated portion of the film by dissolving it with an organic solvent

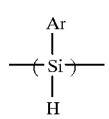
(1)

wherein Ar is a substituted or non-substituted aryl group.

12. The method of forming a pattern according to claim 11, wherein said organosilane compound film further contains a compound which is capable of generating a radical or an acid as it is irradiated by an actinic radiation.

13. The method of forming a pattern according to claim 12, wherein said compound which is capable of generating a radical or an acid is an organic halogen compound represented by the general formula (2) shown below:

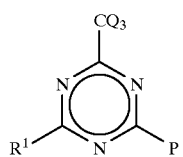
(2)

wherein Q is bromine atom or chlorine atom; P is —$CQ_3$, —$NH_2$, —$NHR^2$, —$N(R^2)_2$, —$OR^2$ or a substituted or non-substituted phenyl group, wherein is as above defined, $R^2$ is phenyl group, naphthyl group or lower alkyl group having not more than 6 carbon atoms; and $R^1$ is —$CQ_3$, —$NH_2$, —$NHR^2$, —$N(R^2)_2$, —$OR^2$, —$(CH=CH)_n$ —W or a substituted or non-substituted phenyl group wherein Q and $R^2$ are as above defined, n is an integer of 1 to 3, W is an aromatic group, heterocyclic group or a group represented by the following general formula (3)

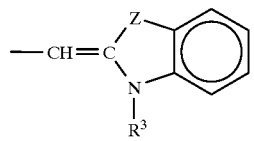
(3)

wherein Z is oxygen atom or sulfur atom; and $R^3$ is lower alkyl group or phenyl group.

14. The method of forming a pattern according to claim 13, wherein said compound which is capable of generating a radical or an acid is mixed in said composition at a ratio of 0.01 to 3 wt. % based on said polysilane.

15. The method of forming a pattern according to claim 11, wherein said organosilane compound film further contains an organometallic compound.

16. The method of forming a pattern according to claim 11, wherein said organosilane compound film further contains at least one kind of powders selected from $SiO_2$ fine powder and SiN fine powder.

17. The method of forming a pattern according to claim 11, which further comprises a step of heat-drying the organosilane compound film after the developing step thereby to turn the film into a three-dimensional structure.

18. A method of forming a pattern comprising the steps of:

forming a film of an organosilane compound comprising a silicon polymer composition comprising a polysilane having a repeating unit represented by the following general formula (1) and a compound which is capable of generating a radical or an acid as it is irradiated by an actinic radiation

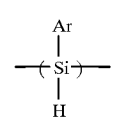
(1)

wherein Ar is a substituted or non-substituted aryl group on a substrate;

irradiating an actinic radiation onto a predetermined portion of the film of the organosilane compound formed on the substrate;

immersing the organosilane compound film irradiated in the preceding step in a solution containing a color component to coloring the organosilane compound film; and heat-drying the organosilane compound film colored in the preceding step to turn the film into a three-dimensional structure.

19. The method of forming a pattern according to claim 18, wherein said compound which is capable of generating a radical or an acid is an organic halogen compound represented by the general formula (2) shown below:

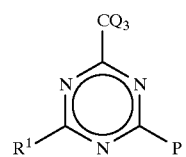
(2)

wherein Q is bromine atom or chlorine atom; P is -$CQ_3$, -$NH_2$, -$NHR^2$, -$N(R^2)_2$, -$OR^2$ or a substituted or non-substituted phenyl group, wherein is as above defined, $R^2$ is phenyl group, naphthyl group or lower alkyl group having not more than 6 carbon atoms; and $R^1$ is -$CQ_3$, -$NH_2$, -$NHR^2$, -$N(R^2)_2$, -$OR^2$, —$(CH=CH)_n$ -W or a substituted or non-substituted phenyl group, wherein Q and $R^2$ are as above defined, n is an integer of 1 to 3, W is an aromatic group, heterocyclic group or a group represented by the following general formula (3)

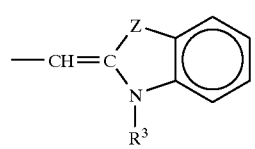
(3)

wherein Z is oxygen atom or sulfur atom; and $R^3$ is lower alkyl group or phenyl group.

20. The method of forming a pattern according to claim 19, wherein said compound which is capable of generating a radical or an acid is mixed in said composition at a ratio of 0.01 to 3 wt. % based on said polysilane.

21. A method of forming a pattern comprising the steps of:
forming a film of an organosilane compound comprising a polysilane having a repeating unit represented by the following general formula (4) on a substrate;
irradiating an actinic radiation onto a predetermined portion of the film of the organosilane compound formed;
impregnating at least one kind of powders selected from SiO$_2$ powder and SiN powder in said predetermined portion irradiated by the actinic radiation; and
heat-drying the film of the organosilane compound after the aforementioned impregnating step thereby to turn the film into a three-dimensional structure

(4)

wherein R$^4$ is a substituted or non-substituted aryl group, or a substituted or non-substituted alkyl group.

22. A method of forming an insulating film comprising the steps of:
forming a film of an organosilane compound comprising a polysilane having a repeating unit represented by the following general formula (1) on a substrate; and
heat-drying the film of the organosilane compound in an oxygen-containing atmosphere thereby to turn the film into a three-dimensional structure.

(1)

wherein Ar is a substituted or non-substituted aryl group.

23. The method of forming an insulating film according to claim 22, wherein said heat-drying is performed at a temperature of 100 to 600° C.

24. The method of forming an insulating film according to claim 22, which further comprises a step of irradiating the entire surface of said organosilane compound film in an oxygen-containing atmosphere prior to the heat-drying step of the organosilane compound film.

25. The method of forming an insulating film according to claim 24, which further comprises a step of immersing said organosilane compound film in a sol containing an metal alkoxide after the step of irradiating the entire surface of said organosilane compound film, but before said heat-drying step.

26. The method of forming an insulating film according to claim 24, which further comprises a step of impregnating at least either one of SiO$_2$ fine powder and SiN fine powder in said organosilane compound film after the step of irradiating the entire surface of said organosilane compound film, but before said heat-drying step.

27. A method of forming an insulating film comprising the steps of:
forming a film of an organosilane compound comprising a silicon polymer composition of claim 1 on a substrate; and
heat-drying the film of the organosilane compound in an oxygen-containing atmosphere thereby to turn the film into a three-dimensional structure.

28. The method of forming an insulating film according to claim 27, wherein said heat-drying is performed at a temperature of 100 to 600° C.

29. The method of forming an insulating film according to claim 27, which further comprises a step of irradiating the entire surface of said organosilane compound film in an oxygen-containing atmosphere prior to the heat-drying step of the organosilane compound film.

30. The silicon polymer composition according to claim 1, wherein the substituted aryl group Ar is substituted by alkyl, fluoroalkyl, bromine, alkoxy, hydroxy or cyano.

31. The method according to claim 4, wherein the substituted aryl group Ar is substituted by alkyl, fluoroalkyl, bromine, alkoxy, hydroxy or cyano.

32. The method according to claim 11, wherein the substituted aryl group Ar is substituted by alkyl, fluoroalkyl, bromine, alkoxy, hydroxy or cyano.

33. The method according to claim 18, wherein the substituted aryl group Ar is substituted by alkyl, fluoroalkyl, bromine, alkoxy, hydroxy or cyano.

34. The method according to claim 21, wherein the substituted aryl group Ar is substituted by alkyl, fluoroalkyl, bromine, alkoxy, hydroxy or cyano.

35. The method according to claim 22, wherein the substituted aryl group Ar is substituted by alkyl, fluoroalkyl, bromine, alkoxy, hydroxy or cyano.

36. The method according to claim 27, wherein the substituted aryl group Ar is substituted by alkyl, fluoroalkyl, bromine, alkoxy, hydroxy or cyano.

* * * * *